US005545356A

United States Patent [19]
Curtis et al.

[11] Patent Number: 5,545,356
[45] Date of Patent: Aug. 13, 1996

[54] INDUSTRIAL COOLING TOWER

[75] Inventors: Harold D. Curtis; Randal K. Oberlag, both of Chickasha, Okla.

[73] Assignee: Tower Tech, Inc., Chickasha, Okla.

[21] Appl. No.: 352,023

[22] Filed: Nov. 30, 1994

[51] Int. Cl.⁶ .......................................... B01F 3/04
[52] U.S. Cl. ........................ 261/23.1; 261/30; 261/111; 261/DIG. 11; 52/745.09; 52/745.20
[58] Field of Search .............................. 261/30, DIG. 11, 261/111, 23.1; 52/745.09, 745.19, 745.20

[56] References Cited

U.S. PATENT DOCUMENTS

| 965,116 | 7/1910 | Morison . |
| 1,002,578 | 9/1911 | Gayley . |
| 1,074,913 | 10/1913 | Walter . |

FOREIGN PATENT DOCUMENTS

| 511792 | 1/1921 | France . | |
| 720676 | 2/1932 | France | 261/DIG. 11 |
| 876525 | 11/1942 | France . | |
| 1158377 | 6/1958 | France . | |
| 389867 | 2/1924 | Germany . | |
| 1451155 | 2/1969 | Germany . | |
| 2250776 | 4/1974 | Germany . | |
| 2522155 | 1/1976 | Germany . | |
| 2547719 | 4/1977 | Germany . | |
| 3501278 | 7/1985 | Germany . | |
| 52-26645 | 2/1977 | Japan . | |
| 51-152245 | 11/1979 | Japan . | |
| 57-142483 | 3/1982 | Japan . | |
| 63-210594 | 8/1988 | Japan . | |
| 15386 | 9/1905 | Norway . | |
| 929985 | 5/1982 | U.S.S.R. . | |
| 1502944A | 8/1989 | U.S.S.R. . | |
| 1511562A | 9/1989 | U.S.S.R. . | |
| 711303 | 6/1954 | United Kingdom . | |
| 1047454 | 11/1966 | United Kingdom . | |
| 1419623 | 12/1975 | United Kingdom . | |

OTHER PUBLICATIONS

Cooling Towers, "Power" Mar. 1973, pp. S–9 to S–11.
Paper entitled "Drainage Collection System Shape of the Things to Come?" by Marcel R. Lefevre (1987).
*Power Engineering*, Mar., 1988, article entitled "'New' drainage system upgrades cooling towers" by Marcel R. Lefevre.
*Power Engineering*, Jul., 1987, article entitled "Technology, education, upgrading boost cooling tower performance" R. C. Rittenhouse.
Exhibit A—Untitled drawing (Undated but admitted to be prior art).

(List continued on next page.)

*Primary Examiner*—Tim R. Miles
*Attorney, Agent, or Firm*—Dougherty, Hessin, Beavers & Gilbert

[57] ABSTRACT

A direct forced counterflow cooling tower apparatus includes concrete side walls having L-shaped troughs located at the lower ends thereof. The cooling tower includes a liquid distribution system, fill material located below the liquid distribution system, a drainage collection system located below the fill material and a fan located below the drainage collection system. Liquid is supplied to the tower and is distributed on top of the fill material. The liquid will pass downward therethrough and will be collected by the drainage collection system. The drainage collection system will communicate the liquid to the troughs located at the lower end of the longitudinal side walls. A modular cooling tower construction includes the cooling tower apparatus in combination with at least one additional cooling tower apparatus. The first and at least one additional cooling tower apparatus are aligned longitudinally in series so that the first troughs of the first and at least one additional cooling tower apparatus form a first substantially continuous liquid passageway and so that the second troughs of the first and the at least one additional cooling tower apparatus form a second substantially continuous liquid passageway. The liquid received in the first and second continuous liquid passageways exit the modular cooling tower construction and is dumped in a reservoir.

40 Claims, 16 Drawing Sheets

U.S. PATENT DOCUMENTS

| | | | |
|---|---|---|---|
| 1,102,813 | 7/1914 | Stocker . | |
| 1,287,402 | 12/1918 | Nordberg . | |
| 1,343,832 | 6/1920 | Kuypers . | |
| 1,383,039 | 6/1921 | Uhde . | |
| 1,549,068 | 8/1925 | Dickey . | |
| 1,647,281 | 11/1927 | Doyle . | |
| 2,231,088 | 2/1941 | Richardson | 261/112 |
| 2,250,978 | 7/1941 | Weiland et al. | 62/140 |
| 2,299,920 | 10/1942 | Moore | 261/30 |
| 2,311,155 | 2/1943 | Carr | 261/30 |
| 2,437,484 | 3/1948 | Simons | 261/109 |
| 2,445,908 | 7/1948 | DeFlon et al. | 261/23 |
| 2,606,750 | 8/1952 | Jacir | 261/30 |
| 2,636,371 | 4/1953 | Stephens | 62/168 |
| 2,775,310 | 12/1956 | Shelton | 183/26 |
| 2,780,306 | 2/1957 | Boyle et al. | 183/14 |
| 2,833,122 | 5/1958 | Kohl et al. | 62/2 |
| 2,890,870 | 6/1959 | Spiselman | 261/30 |
| 2,915,302 | 12/1959 | Jacir | 261/30 |
| 3,168,596 | 2/1965 | Jamison | 261/29 |
| 3,214,348 | 10/1965 | Lichtenstein | 202/47 |
| 3,226,894 | 1/1966 | Burchardt et al. | 52/223 |
| 3,253,819 | 5/1966 | Talbot | 261/25 |
| 3,259,177 | 7/1966 | Niemann | 165/34 |
| 3,262,682 | 7/1966 | Bredberg | 261/29 |
| 3,290,867 | 12/1966 | Jacir | 55/258 |
| 3,363,885 | 1/1968 | Meek | 261/30 |
| 3,384,165 | 5/1968 | Mathews | 165/122 |
| 3,608,873 | 9/1971 | Furlong | 261/30 |
| 3,739,556 | 6/1973 | Waters | 55/257 |
| 3,878,273 | 4/1975 | Anderson | 261/151 |
| 3,917,765 | 11/1975 | Furlong et al. | 261/DIG. 11 |
| 3,969,447 | 7/1976 | Glitsch et al. | 261/111 |
| 4,044,078 | 8/1977 | Curtis et al. | 261/30 |
| 4,094,937 | 6/1978 | Bodick et al. | 261/111 |
| 4,157,368 | 6/1979 | Fernandes | 261/DIG. 11 |
| 4,215,080 | 7/1980 | Ribier et al. | 261/111 |
| 4,218,408 | 8/1980 | Henning et al. | 261/112 |
| 4,242,850 | 1/1981 | Merenyi et al. | 52/745.2 |
| 4,267,130 | 5/1981 | Curtis | 261/112 |
| 4,301,097 | 11/1981 | Curtis | 261/109 |
| 4,385,010 | 5/1983 | Bosne | 261/110 |
| 4,416,835 | 11/1983 | Bosne | 261/110 |
| 4,416,836 | 11/1983 | Sinek | 261/112 |
| 4,422,983 | 12/1983 | Bardo et al. | 261/24 |
| 4,459,244 | 7/1984 | Norbäck | 261/112 |
| 4,521,350 | 6/1985 | Lefevre | 261/111 |
| 4,622,183 | 11/1986 | Sonnenschein et al. | 261/110 |
| 4,637,903 | 1/1987 | Bardo et al. | 261/24 |
| 4,769,186 | 9/1988 | Raybon | 261/109 |
| 4,788,013 | 11/1988 | Kinney, Jr. et al. | 261/24 |
| 4,913,710 | 4/1990 | Reverdv | 261/DIG. 11 |
| 5,028,357 | 7/1991 | Bardo | 261/24 |
| 5,143,657 | 9/1992 | Curtis | 261/89 |
| 5,152,458 | 10/1992 | Curtis | 239/222.17 |
| 5,227,095 | 7/1993 | Curtis | 261/30 |
| 5,236,625 | 8/1993 | Bardo et al. | 261/24 |

OTHER PUBLICATIONS

U.S. patent application Ser. No. 08/161,069 applied for Dec. 3, 1993, by Harold Curtis.

U.S. patent application Ser. No. 08/240,280, which is a continuation–in–part of 08/161,069, applied for May 10, 1994, by Harold Curtis.

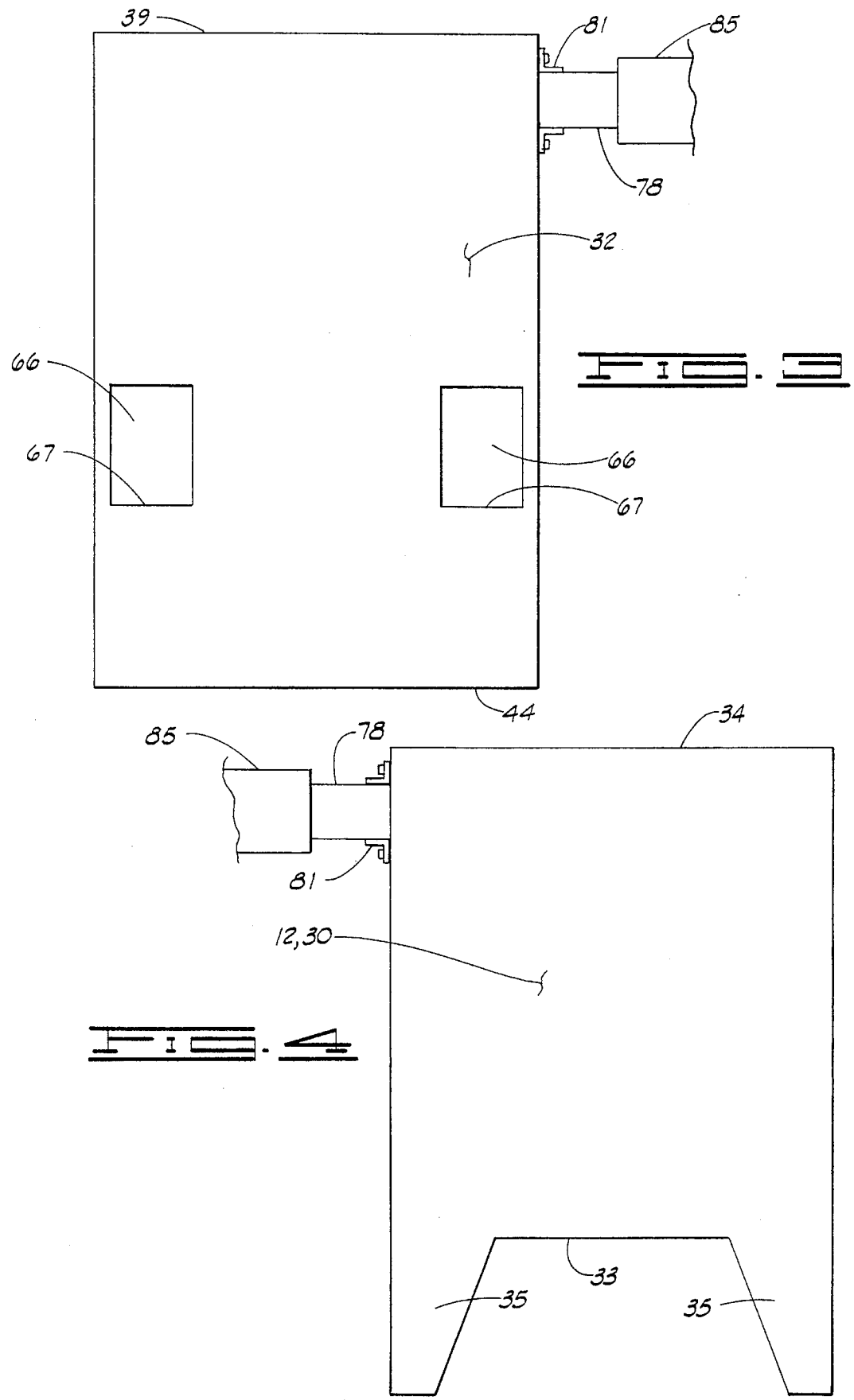

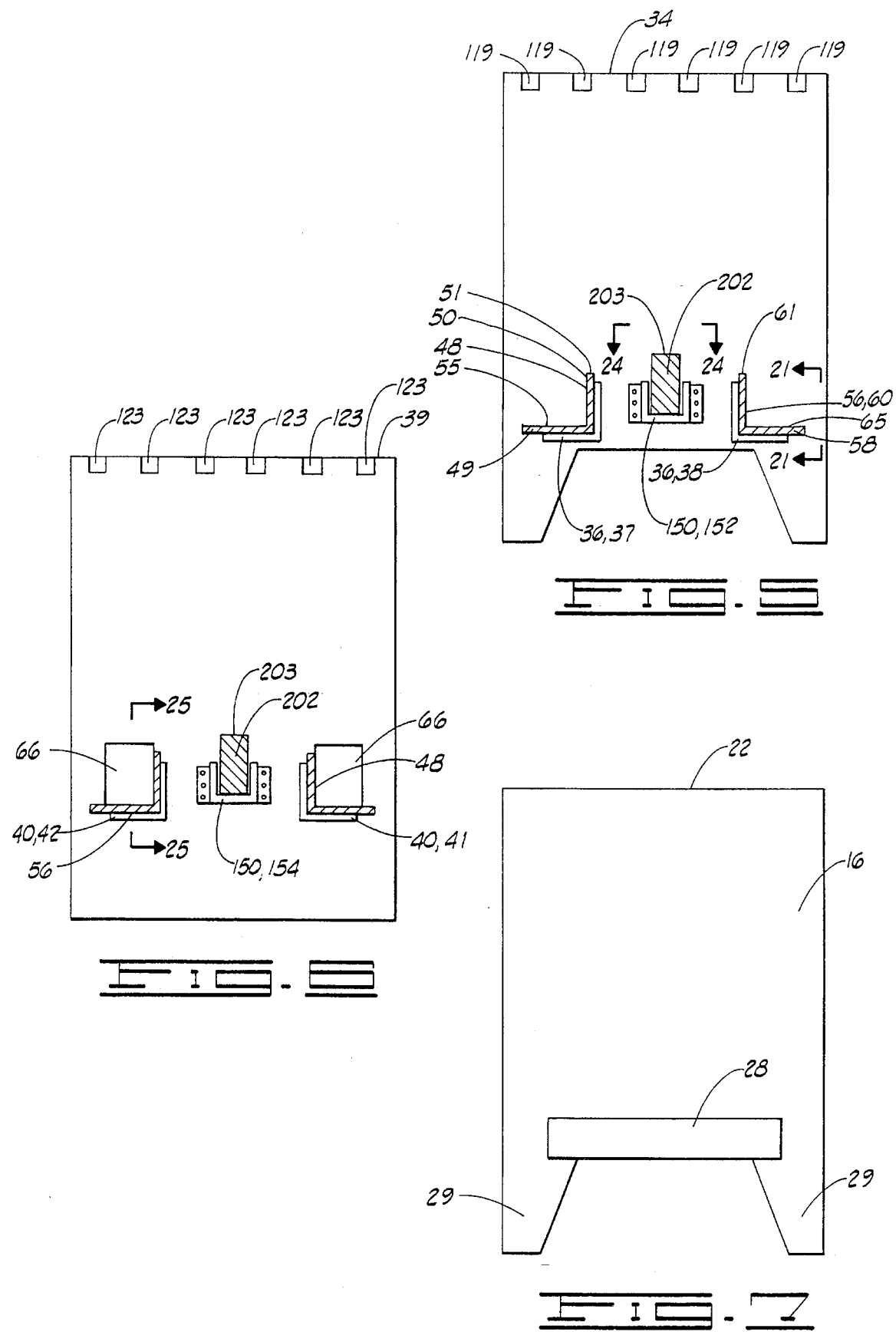

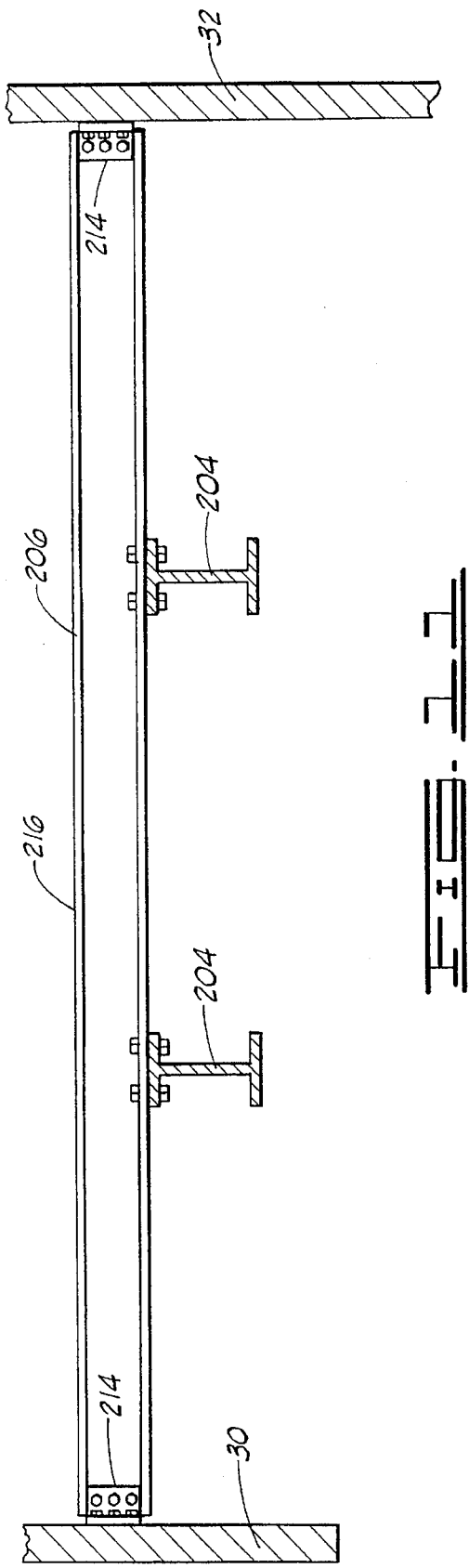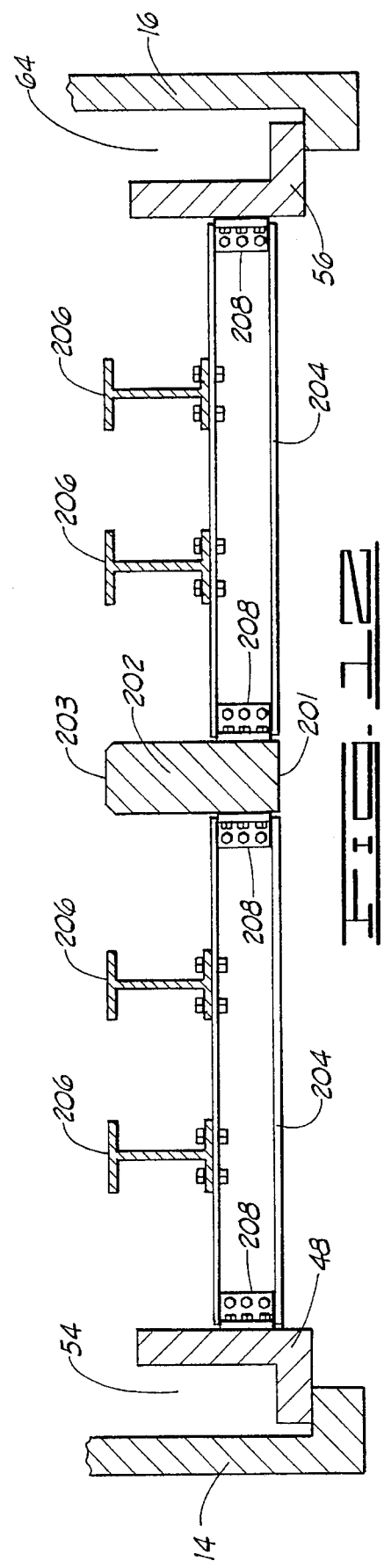

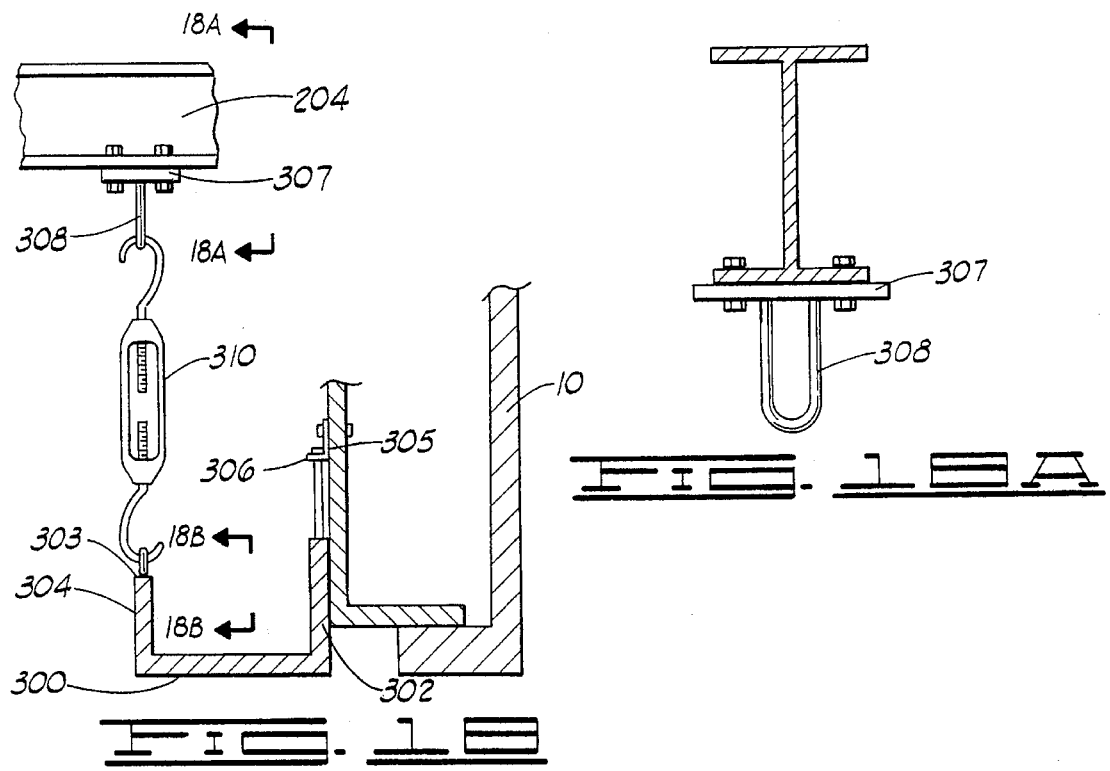
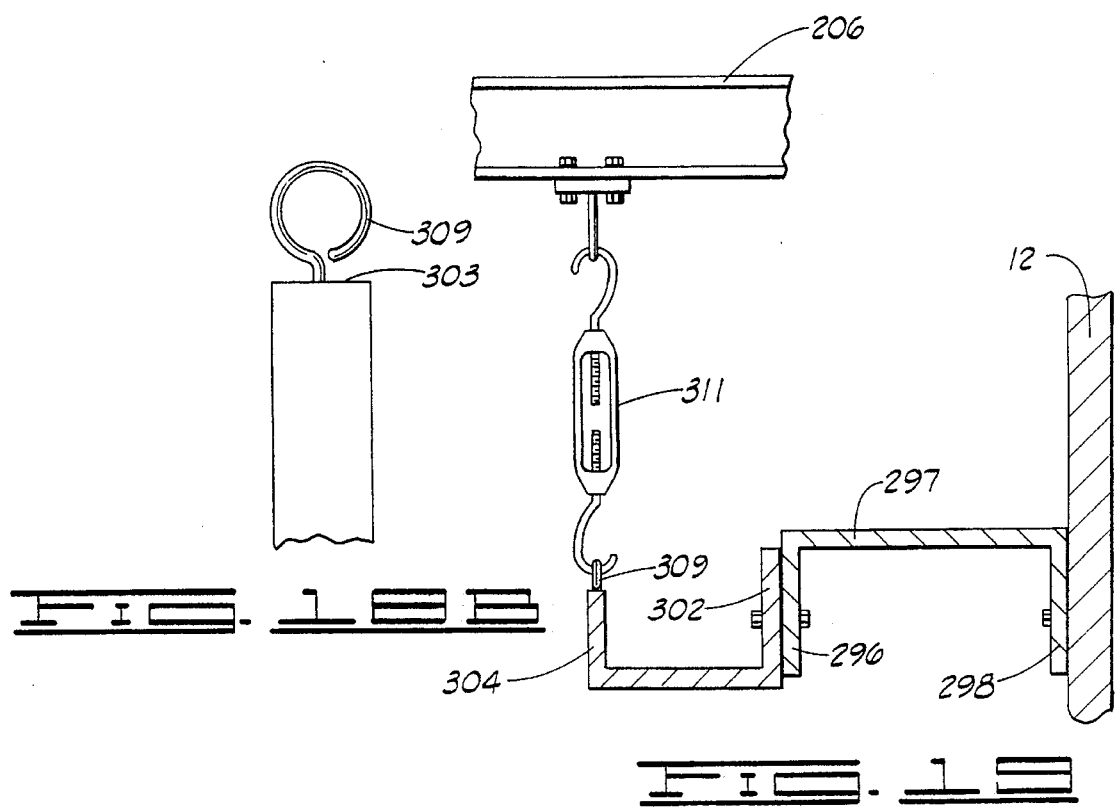

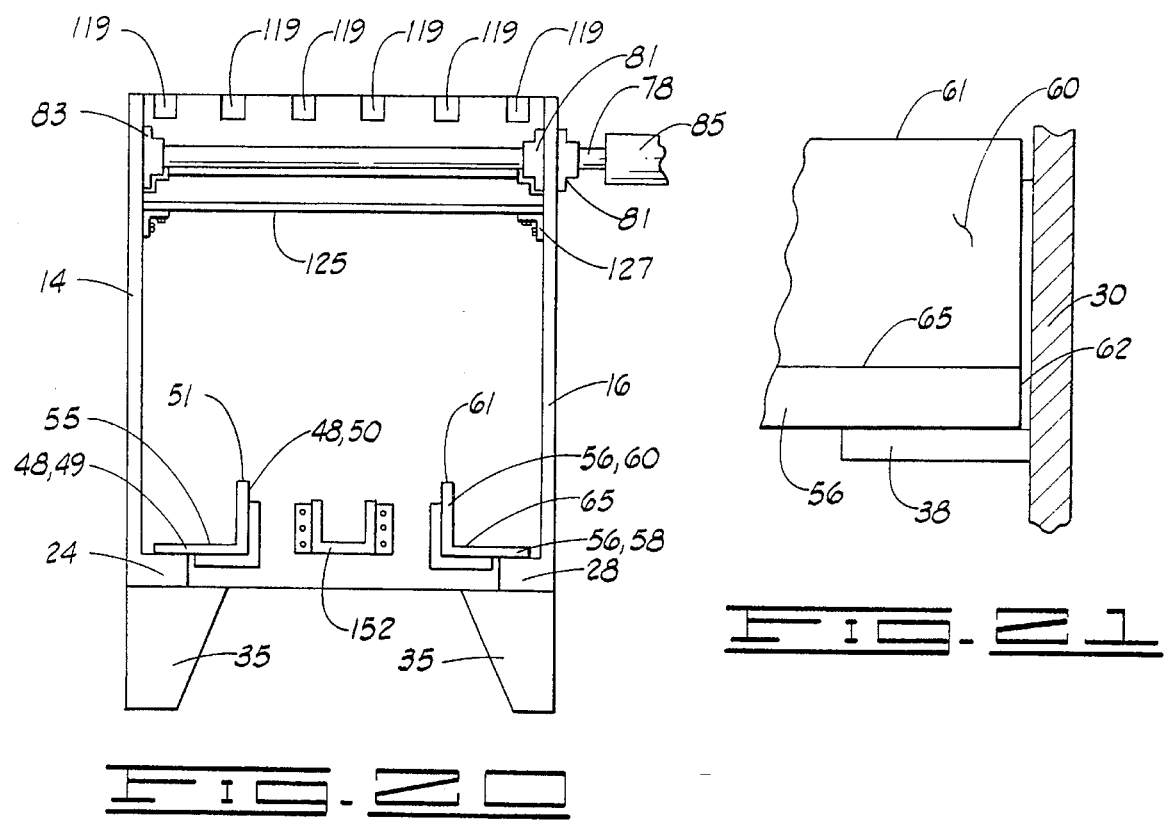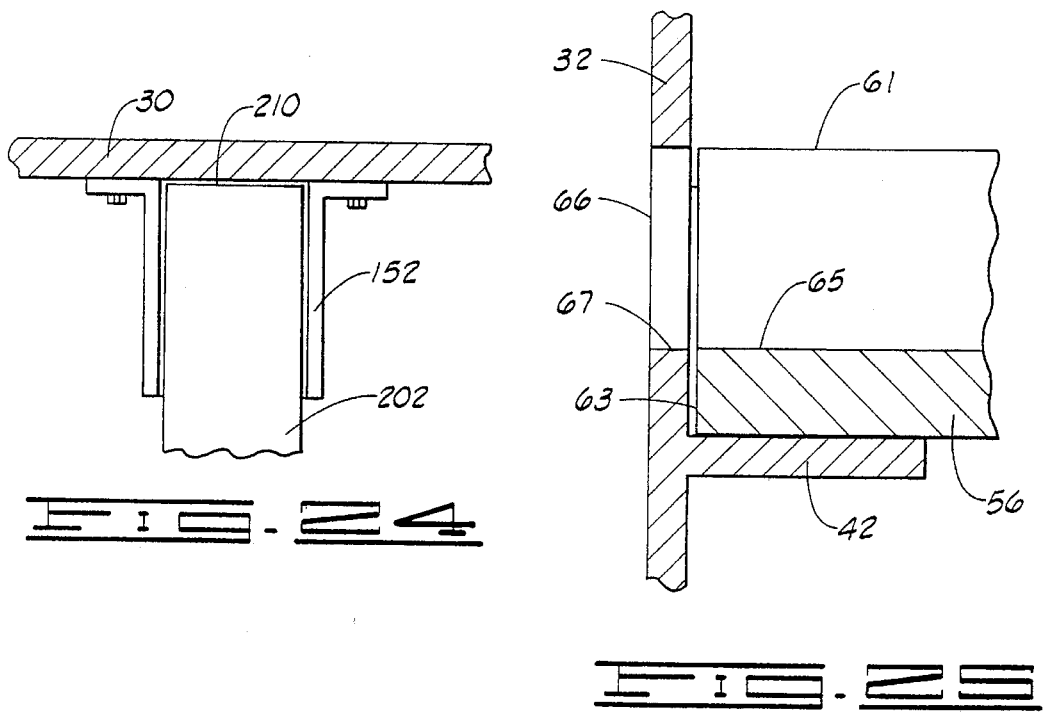

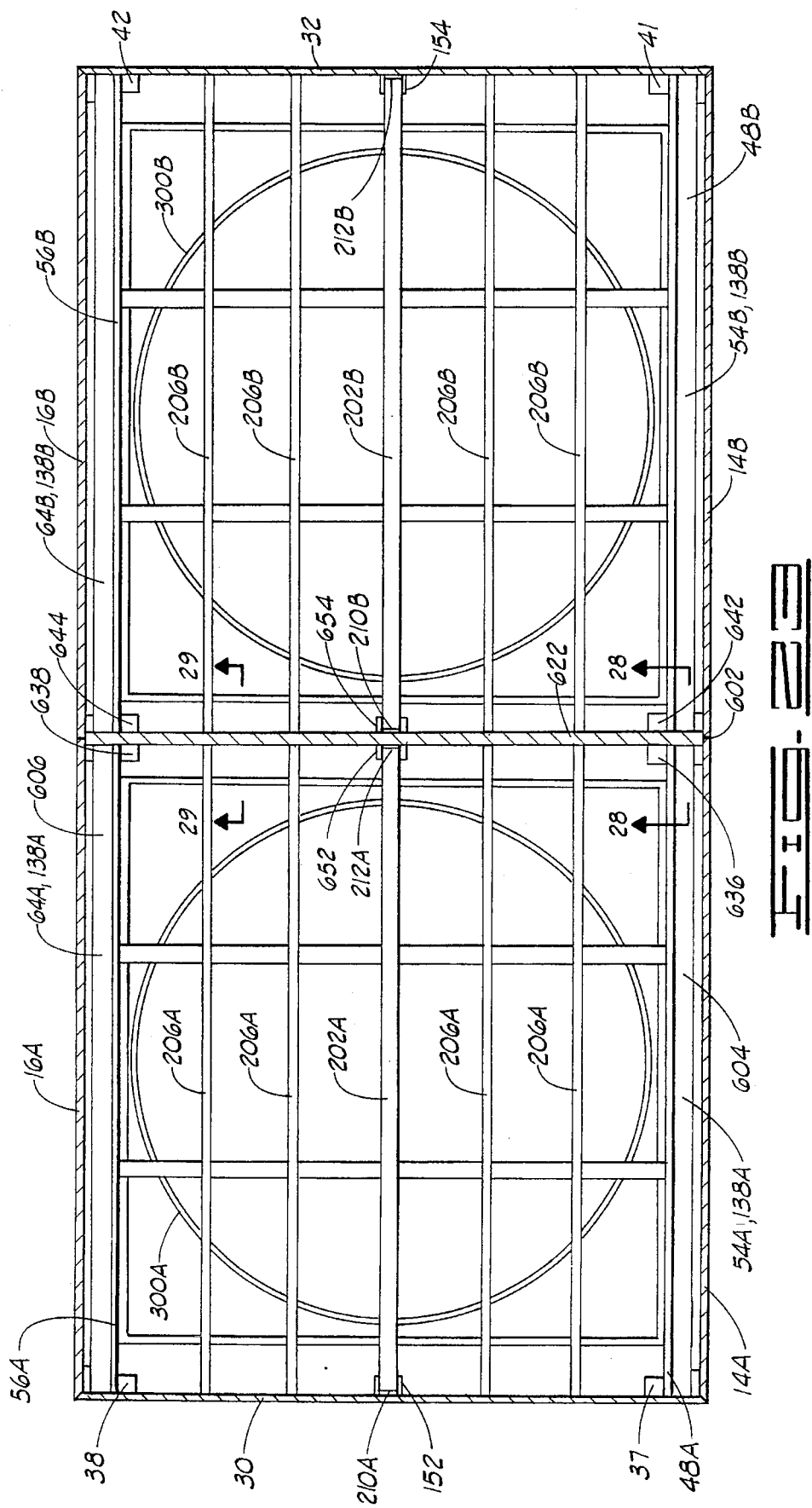

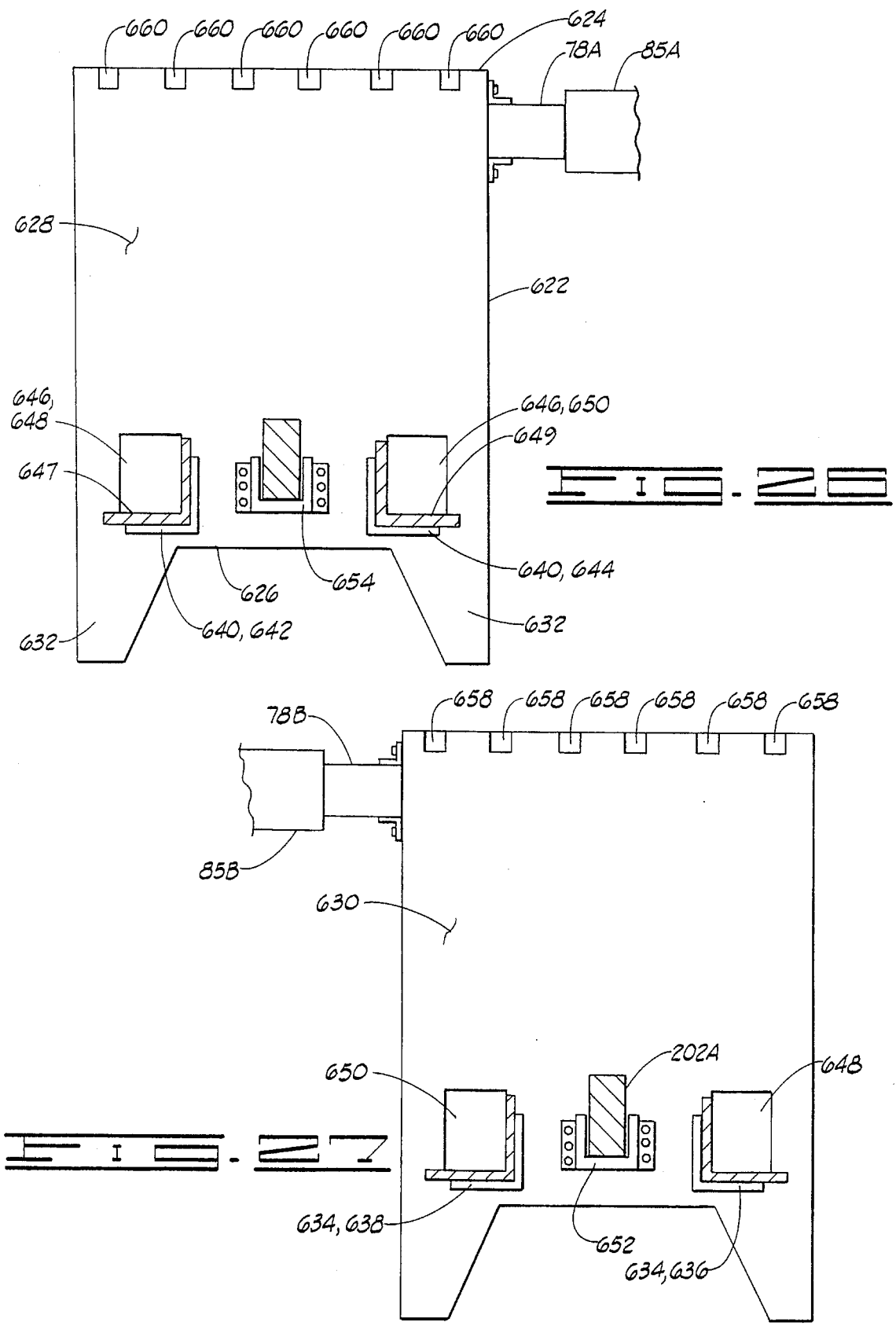

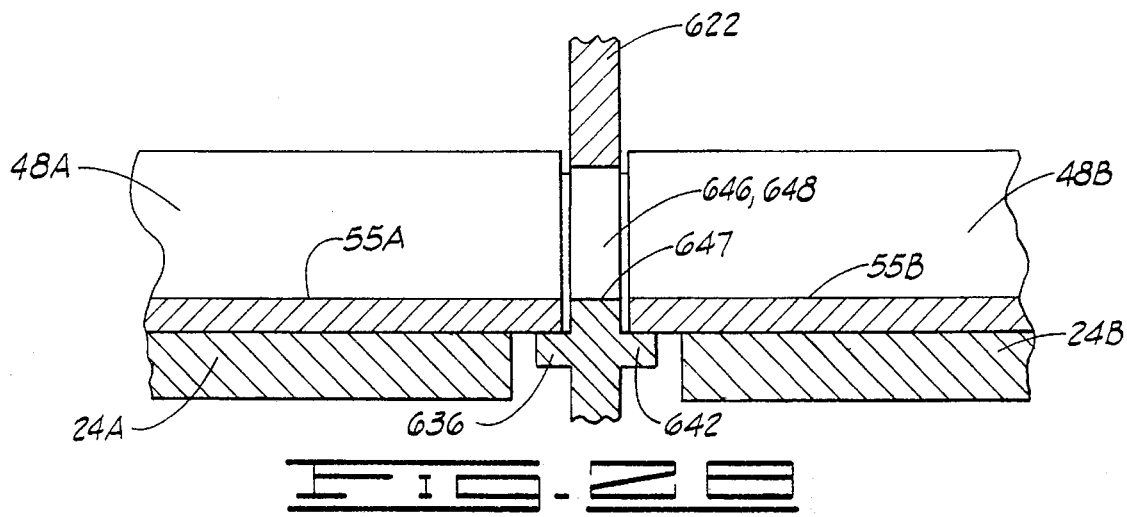
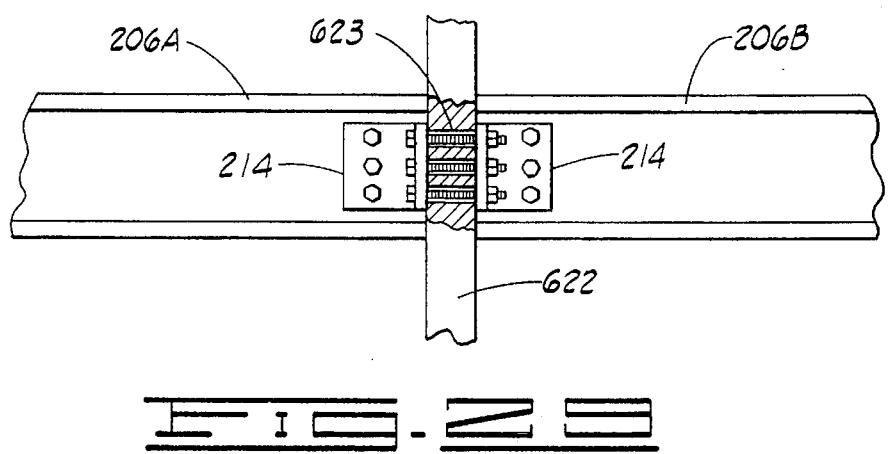
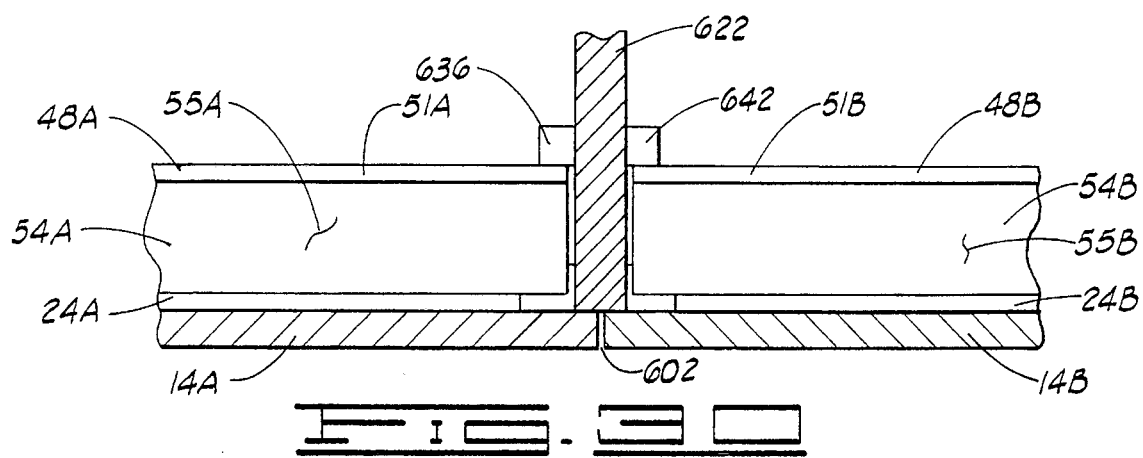

INDUSTRIAL COOLING TOWER

The present invention relates to cooling towers, and more particularly, but not by way of limitation, to an industrial water cooling tower.

One common type of industrial cooling tower is a counterflow tower wherein water falls downward through a fill layer while cooling air moves upward through the fill material. The term "counterflow" refers to the fact that the warm water and cool air are moving in opposite directions. Counterflow cooling towers traditionally may be of three types, namely induced draft, natural draft and forced draft.

An induced draft counterflow cooling tower has a fan located on top of the tower which sucks air up through the fill material. Air flows laterally along the ground surface adjacent the tower and once it is under the tower it turns ninety degrees and flows upward through the fill material, with this flow being induced by the fans on top of the tower which suck the air up through the tower. Examples of induced draft counterflow cooling towers are seen in U.S. Pat. Nos. 4,267,130 and 4,301,097, both to Curtis.

U.S. Pat. No. 4,521,350 to Lefevre, shows at FIG. 1 thereof a natural draft counterflow cooling tower. A natural draft cooling tower does not utilize a fan to assist the air flow, but instead relies upon the natural tendency of warmer air to flow upward. The natural draft cooling tower shown in U.S. Pat. No. 4,521,350 is the type commonly referred to as a hyperbolic natural draft cooling tower. The Lefevre patent shown the use of a drainage collection system below the fill material in the natural draft counterflow cooling tower thereshown.

U.S. Pat. Nos. 2,606,750 and 2,915,302 to Jacir show forced draft counterflow water cooling towers. Forced draft towers traditionally have a fan located on the side of the tower which blows air into a plenum chamber on the lower side of the tower. A plurality of vanes are used to turn the air ninety degrees to direct it upward through the tower. As used in the trade, the term "forced draft" is understood to refer to a system like that of Jacir having a fan on the side of the tower blowing into a lower plenum so that the air must then turn ninety degrees to flow upward through the tower. French Patent No. 1,158,377 to Munters shows a forced draft cooling tower with a vertical axis fan that blows air directly upward through the cooling tower.

A second common type of cooling tower is a cross flow tower. Cross flow cooling towers have the warm water falling downward through fill material while cooling air is drawn in horizontally at approximately ninety degrees to the path of the falling water. These cross flow cooling towers are typically induced draft towers which have a plenum chamber and fan located on top of the tower sucking the air up through the tower.

The prior art also includes a cross flow cooling tower having a fan located below the tower for forcing air upward into a central plenum chamber so that the air then turns ninety degrees and flows horizontally out through the fill material which is located around the perimeter of the tower. Such a system has been marketed by the Marley Cooling Tower Company. In that system, there is no fill material located directly above the fan, but rather the fill material is all located around the perimeter of the fan, with the area directly above the fan defining a plenum chamber into which the fan blows.

The prior art also includes many versions of drainage collection systems made up of a series of overlapping sloped collection plates with troughs along their lower edge. Such a system is shown for example in the Lefevre U.S. Pat. No. 4,521,350 cited above.

Industrial cooling towers typically are very large structures having lateral dimensions on the order of twenty to as much as five hundred feet and having a height on the order of twenty to thirty feet. Typical delay between the time of order and the time of completion of an industrial cooling tower is on the order of one year. The construction of such a tower is a major undertaking.

Such structures are typically constructed of wood. Because wood is susceptible to deterioration in such a wet environment, constant maintenance is required, and such towers have a limited life span.

Some of the difficulties associated with the construction of such a cooling tower are addressed by the modular cooling tower systems recently introduced by the assignee of the present invention. That system is shown and described in U.S. Pat. No. 5,227,095 to Curtis, the details of which are incorporated herein by reference. The system of the Curtis '095 patent consists of individual modules which can be built in a factory and then transported to a field site where they can be erected and attached at many industrial locations. However, there are times when there is such a great capacity of cooling required that the modular system described in the '095 patent may be impractical for use. The modules described in the Curtis '095 patent have the fan located below the fill material for forcing air directly upward through the fill. Applicant hereby acknowledges that the Curtis '095 patent constitutes prior art to the present application.

SUMMARY OF THE INVENTION

The present invention provides a cooling tower which can be constructed in less time than the typical industrial cooling tower, and which requires less maintenance and has a longer life. The present invention further provides a modular cooling tower construction which is easily constructed and which can be built to such a size as to handle any capacity of cooling that may be required.

The cooling tower apparatus of the present invention includes a walled enclosure, which may be a four-sided enclosure defined by a pair of upstanding, or vertical longitudinal side walls and a pair of upstanding, or vertical transverse end walls. The pair of longitudinal side walls may include a first longitudinal side wall and a second longitudinal side wall with a space defined therebetween, and which may include a first trough and a second trough defined at the lower ends respectively thereof. The transverse end walls may comprise a rear end wall and a forward end, or exit wall. The first and second longitudinal side walls are preferably, but are not limited to, concrete side walls. Likewise, the transverse end walls may be, but are not limited to, concrete end walls.

The cooling tower apparatus further includes a body of fill material disposed in the enclosure, a liquid distribution system positioned above the fill material within the enclosure, a drainage collection system located below the fill material and a fan positioned below the drainage collection system for blowing air upward through the fill material.

The liquid distribution system will distribute liquid on top of the fill material. The liquid will gravitate downward through the fill material and will be collected by the drainage collection system. The drainage collection system communicates the liquid collected therein to the first and second troughs. Thus, the first and second troughs comprise a liquid receiving means operably associated with the first and second longitudinal side walls. A reservoir may be located adjacent the cooling tower apparatus, so that liquid received in the first and second troughs will exit the cooling tower through the exit wall and will be dumped into the reservoir.

The cooling tower apparatus may be constructed utilizing "tilt-up" construction as that term is well known in the construction art and more fully described hereinbelow. Because such construction is possible, the cost of construction of the concrete cooling tower of the present invention is competitive with the cost of construction of wood cooling towers, and may be constructed in a shorter period of time. The apparatus may also be constructed utilizing pre-fabricated walls which can be delivered to a construction site. In either case, the time for construction is much shorter than the time required to construct a typical industrial cooling tower.

The present invention also provides a modular cooling tower construction which includes a first cooling tower apparatus and a second, substantially similar cooling tower apparatus in combination with the first cooling tower apparatus. Each apparatus includes first and second longitudinal side walls with first and second troughs located at the lower ends thereof. The first and second longitudinal side walls are parallel and have a space defined therebetween. A body of fill material is disposed in the space between the first and the second longitudinal side walls. A liquid distribution system is located above the fill material, a drainage collection system is located below the fill material and a fan is located below the drainage collection system for blowing air upward through the fill material. Liquid collected in the drainage collection system is communicated to and received in the first and second troughs.

The first and second cooling tower apparatus are arranged longitudinally in series so that the first trough of the first cooling tower apparatus is connected to the first trough of the second cooling tower apparatus to form a substantially continuous first liquid passageway. Likewise, the second trough of the first cooling tower apparatus and the second trough of the second cooling tower apparatus are connected to form a substantially continuous second liquid passageway.

The modular cooling tower construction may further include a reservoir adjacent an exit wall of the modular cooling tower construction. The liquid received in the first and second liquid passageways will flow through the exit wall and into the reservoir. The modular cooling tower construction may further include at least one additional cooling tower apparatus in combination with the first and second cooling tower apparatus. The at least one additional cooling tower apparatus is substantially similar to the first and second cooling tower apparatus and is arranged longitudinally in series therewith as described above. The first and second troughs of the at least one additional cooling tower apparatus are thus connected to and aligned with the first and second troughs of the first and second cooling tower apparatus, so that the first and second substantially continuous liquid passageways are comprised of the first and second troughs respectively of the first, second and at least one additional cooling tower apparatus. Thus, the modular cooling tower construction may be expanded to handle virtually any capacity that may be required.

BRIEF DESCRIPTION OF THE DRAWINGS

FIG. 3 is a view of the forward end of a cooling tower apparatus of the present invention.

FIG. 4 is a view of the rear end of a cooling tower apparatus of the present invention.

FIG. 5 is a view of the inside of a rear end wall of the present invention, with the trough legs and longitudinal center beam shown in cross-section.

FIG. 6 is a view of the inside of a forward end wall of the present invention, with the trough legs and longitudinal center beam shown in cross section.

FIG. 7 is a view of the inside of a side wall of the present invention.

FIG. 11 is a section view taken from line 11—11 shown on FIG. 10, without the fan shroud.

FIG. 12 is a section view taken from line 12—12 shown on FIG. 10, without the fan shroud.

FIG. 18 shows a view taken from line 18—18 on FIG. 10 and shows the attachment of the fan shroud of the present invention.

FIGS. 18A and 18B show views taken from lines 18A—18A and 18—18B on FIG. 18.

FIG. 19 is a view taken from line 19—19 on FIG. 10 and shows the attachment of the fan shroud of the present invention.

FIG. 20 shows a view of the enclosure of the cooling tower apparatus with the forward end wall removed, and without the fill material or drainage collection system.

FIG. 21 shows a view taken from line 21—21 of FIG. 5.

FIG. 23 shows a view taken from line 23—23 looking downward at the framing network of the invention of FIG. 22.

FIG. 24 shows a view taken from line 24—24 of FIG. 5.

FIG. 25 shows a view taken from line 25—25 of FIG. 6.

FIG. 26 is a view taken through line 26—26 of FIG. 22 and shows the forward side of a transverse partition wall with the cross section of the trough legs and a longitudinal center beam.

FIG. 27 is a view taken from line 27—27 of FIG. 22 and shows the rear side of a transverse partition wall with the cross section of the trough legs and a longitudinal center beam.

FIG. 28 shows a view taken from line 28—28 on FIG. 23.

FIG. 29 shows a view taken from line 29—29 on FIG. 23.

FIG. 30 shows a view taken from line 30—30 on FIG. 22.

DETAILED DESCRIPTION OF THE PREFERRED EMBODIMENTS

Figure 1:
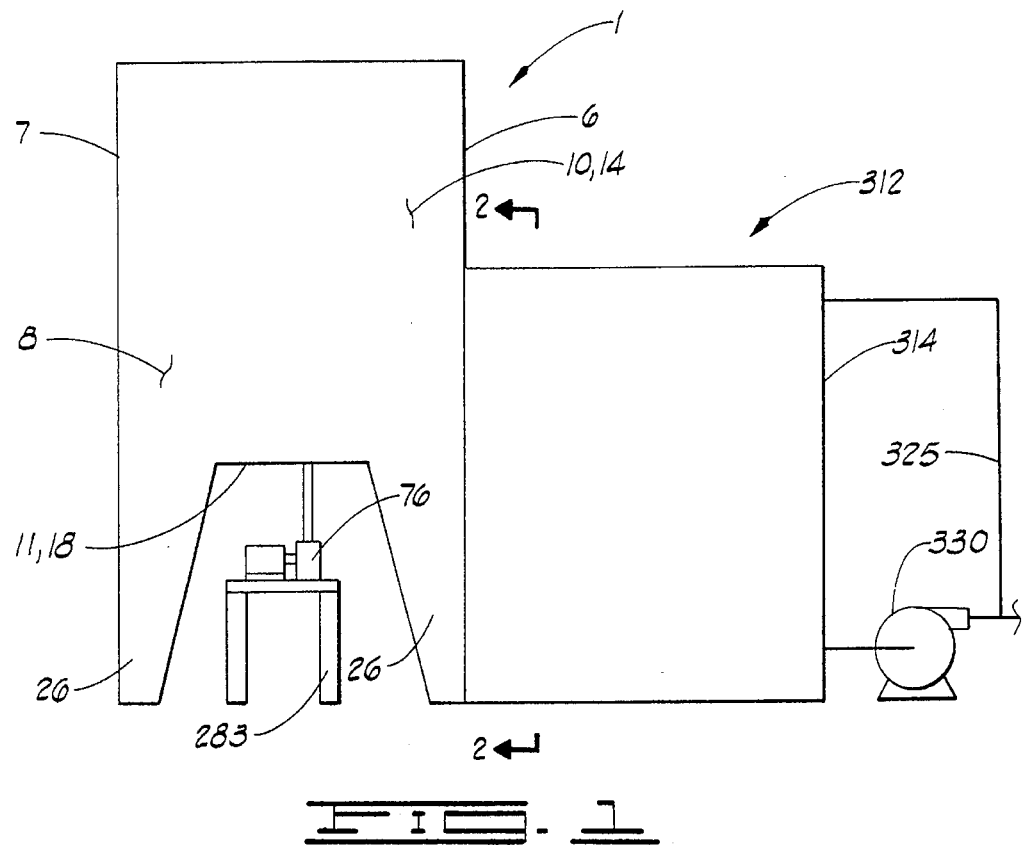
FIG. 1 shows a schematic of a cooling tower apparatus of the present invention and an adjacent reservoir.

Referring now to the Figures and particularly FIG. 1, a cooling tower apparatus generally designated by the numeral 1 is shown. The apparatus includes a walled enclosure 5 which may be a four-sided enclosure defined by a pair of upstanding, or vertical longitudinal side walls 10 and a pair of upstanding, or vertical transverse end walls 12 as better seen in FIGS. 8 and 9 respectively. The apparatus has a forward end 6, a rear end 7, a left or first side 8, and a right, or second side 9. The enclosure also has a lower end 11. Lower end 11 may also be referred to as bottom opening 11. Longitudinal walls 10 may include a first, or left, longitudinal wall 14 and a second, or right, substantially identical longitudinal wall 16. First and second longitudinal walls 14 and 16 are parallel and have a space 15 defined therebetween. First longitudinal wall 14 has a lower end 18, an upper end 19 and an inner surface 20, while second longitudinal wall 16 has a lower end 21, an upper end 22 and an inner surface 23. Lower ends 18 and 21 partially define bottom opening 11. First and second longitudinal walls 14 and 16 are preferably, but are not limited to, concrete walls.

First longitudinal wall 14 has an inwardly extending corbel, or lip 24 disposed at the lower end 18 thereof. A pair of longitudinally opposed legs 26 extend downwardly from lower end 18. Second longitudinal wall 16 has an inwardly extending lip, or corbel, 28 disposed at the lower end thereof. As shown in FIG. 7, the corbels do not extend the full length of the longitudinal side walls. A pair of longitudinally opposed legs 29 extend downwardly from lower end 21 of second longitudinal wall 16. Legs 26 and 29 are preferably integrally cast with walls 14 and 16 respectively. The legs may be cast separately, however, and the walls may be placed on the legs and held in place with dowel pins or other means. Likewise, corbels 24 and 28 are preferably integrally cast with walls 14 and 16 but may, in the alternative, be separately formed and attached to the walls by any means known in the art.

The pair of transverse walls 12 may include a rear transverse end wall 30 and a forward transverse end wall 32. Rear and forward end walls 30 and 32 are preferably, but are not limited to, concrete walls. Rear transverse end wall 30 has an upper end 34 and a lower end 33 which has a pair of transversely opposed legs 35 extending downwardly therefrom. Rear end wall 30 and legs 35 are preferably cast as one unitary piece. However, legs 35 may be formed separately, and walls 30 may be positioned on legs 35 and held in place with dowel pins or other means. End wall 30 further includes a pair of L-shaped rear trough supports 36, which comprise a left or first rear support 37 and a right or second rear support 38 as seen in FIG. 5. Trough supports 37 and 38 are positioned near the lower end 33 of wall 30 and extend forwardly therefrom. Trough supports 37 and 38 are preferably integrally cast as part of wall 30. However, supports 37 and 38 may be formed separately and bolted or otherwise connected to wall 30.

As seen in FIG. 6, forward end wall 32 likewise includes a pair of L-shaped forward trough supports 40 which comprise a left or first forward support 41 and a right or second forward support 42. Trough supports 41 and 42 are substantially directly opposed from supports 37 and 38 respectively, and extend rearwardly from wall 32. Trough supports 41 and 42 are preferably integrally cast as part of wall 32, but may be formed separately and bolted or otherwise connected to wall 32. Forward end wall 32 has a lower end 44 which rests on a ground surface 45, and extends upwardly therefrom to an upper end 39.

Figure 10:
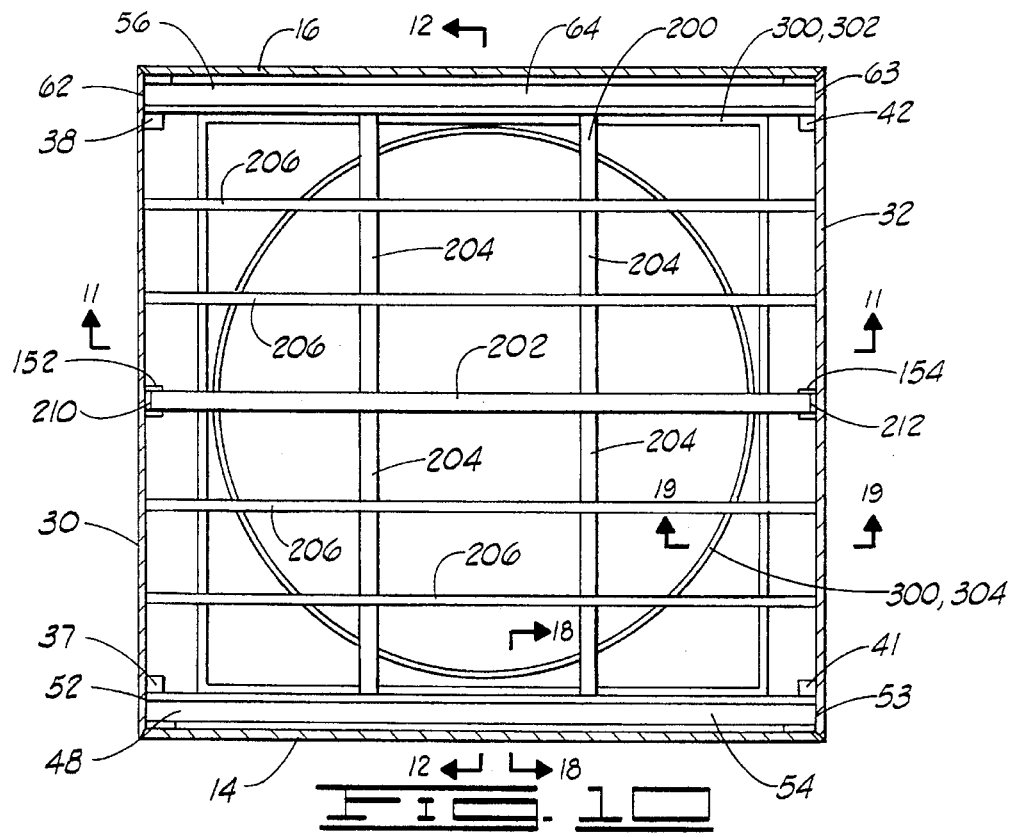
FIG. 10 is a view looking downward at the framing network of the present invention, showing the outer walls in cross-section.
Figure 13:
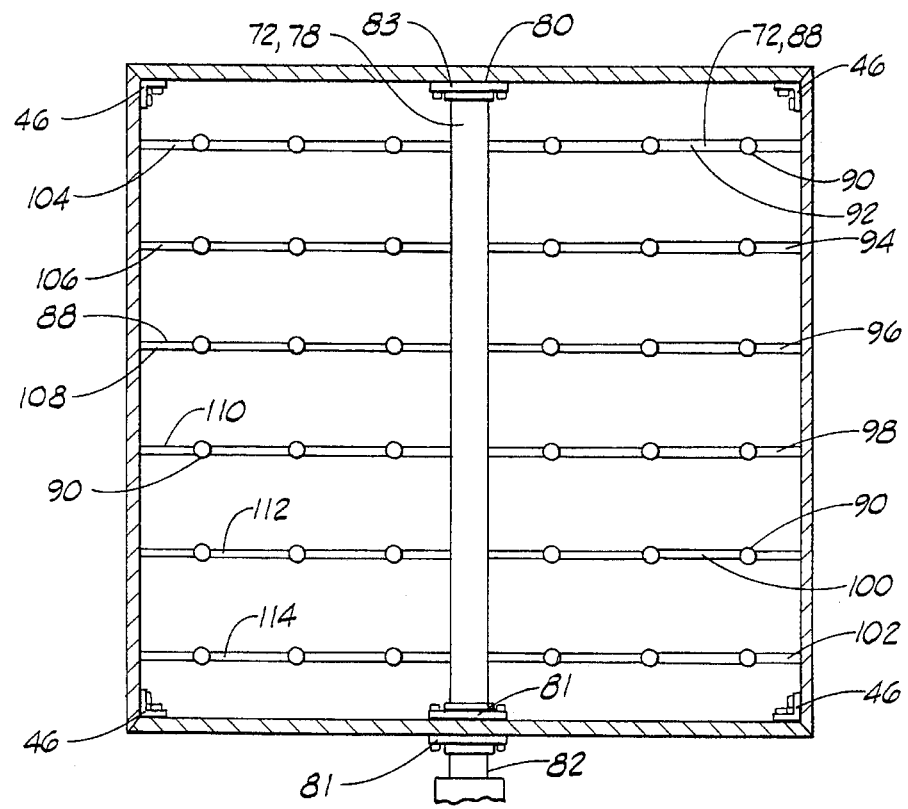
FIG. 13 is a view looking upward at the liquid distribution system of the present invention.

The upper ends of the end walls and the longitudinal side walls may be substantially co-planar. The longitudinal side walls and transverse end walls may have beveled vertical edges so that, as shown in FIGS. 10 and 13, the walls will mate, and may be connected by any means known in the art. For example, the walls may have weld angle plates cast or embedded therein, which can be welded. The walls may also be connected with bolted angles 46 which are bolted to an end wall and side wall as depicted in FIG. 13. At any location where a bolt or other threaded connector is used, the connector may be threaded into an insert which is embedded or cast into the structure which receives the threaded connector. The walls should be connected at a plurality of locations along the height of the walls.

A first substantially L-shaped trough leg 48 having a substantially horizontal bottom portion 49 and a vertical leg portion 50 rests on, and is supported by corbel 24. Bottom portion 49 has an upper surface 55, and leg portion 50 has an upper end 51. Leg 48 has a rear end 52 and a forward end 53, and substantially spans the full length of the apparatus, so that rear end 52 is received in and is supported by rear trough support 37, while forward end 53 is received in and is supported by forward trough support 41. Thus, a first trough 54 is defined at the lower end 18 of wall 14 by leg 48 and side wall 14. The details of the trough legs are better seen in FIGS. 5 and 6.

A second substantially L-shaped trough leg 56, having a substantially horizontal bottom portion 58 and a substantially vertical leg portion 60 rests on and is supported by corbel 28. Bottom portion 58 has an upper surface 65, and leg portion 60 has an upper end 61. Leg 56 has a rear end 62 and a forward end 63, and substantially spans the full length of the apparatus so that rear end 62 is received in and is supported by second rear support 38, while forward end 63 is received in and supported by second forward support 42.

Thus, a second trough 64 is defined at the lower end 21 of wall 16 by leg 56 and second longitudinal side wall 16. Forward wall 32 has a pair of windows or exit openings 66 defined therein. Exit openings 66 may have a lower edge 67 which is substantially co-planar with upper surfaces 55 and 65 of the horizontal bottom portions of legs 48 and 56 respectively. Thus, exit openings 66 are located such that troughs 54 and 64 are communicated therewith, and liquid flowing in troughs 54 and 64 will pass through windows 66. All of the joints between the pieces which form troughs 54 and 64, and any gaps between those pieces, may be sealed using waterproof caulking or other waterproof sealants.

The apparatus of the present invention further includes a body of fill material 70 having an upper or top surface 71 disposed in the enclosure 5, a liquid distribution system 72 located above the fill material, a drainage collection system 74 located below the fill material, and a fan 76 located below the drainage collection system.

Figure 8:
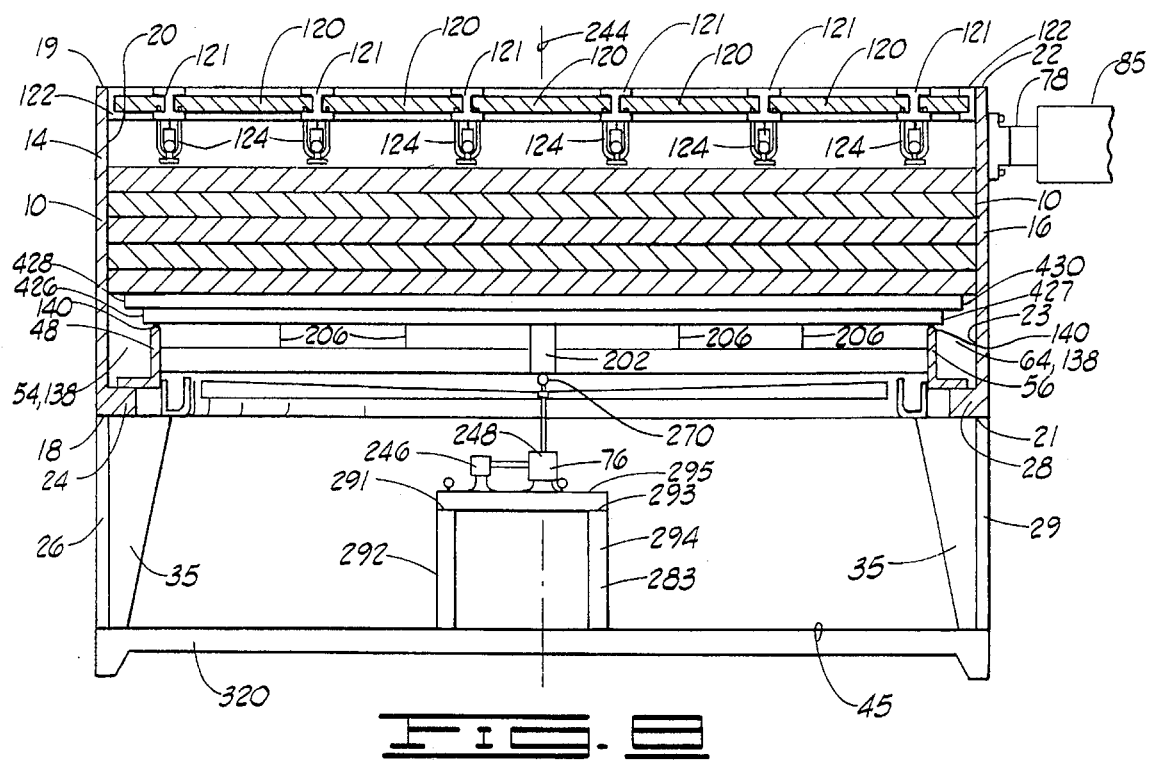
FIG. 8 is an elevation section partially schematic view of the cooling tower of the present invention.

Liquid distribution system 72 includes a main header pipe 78 which spans between longitudinal side walls 14 and 16. A plurality of drift eliminators 120 are located above the liquid supply system and are preferably supported by header pipe 78. The drift eliminators 120 are commercially available materials which minimize the mist which leaves with air flowing upward out of cooling tower apparatus 1. The drift eliminators are held in place by a plurality of I-beams 121 and a pair of opposed channels 122. The channels 122 are bolted or otherwise attached to the opposed longitudinal side walls. I-beams 121 span the distance between the end walls, and are received in a plurality of opposed notches 119 and 123 which are defined at the upper ends of walls 30 and 32 respectively. The notches are better seen in FIGS. 5 and 6. The drift eliminators are received in, and held in place by the legs of the I-beams and the channels as shown in FIG. 8.

The header pipe 78 is capped at a first end 80 thereof and is adapted to receive a liquid supply pipe 85 at a second or open end 82. Thus, as better shown in FIG. 13, first end 80 is held in place by a bolted blind flange 83 on the inside of longitudinal side wall 14 which caps end 80 and prevents fluid communication therethrough. Second end 82 extends through opposed longitudinal side wall 16 and is connected to a liquid supply pipe 85. The header pipe is held in place at the second end by a pair of bolted socket flanges 81. The header pipe may be supported by a header pipe support beam 125. Header pipe support beam 125 may be an I-beam which spans between and is bolted to or otherwise connected to the longitudinal side walls. Thus, the I-beam may be supported by bolted angles 127 as shown in FIG. 20. The beam may be trimmed as necessary to clear the flanges 81 and 83 which hold the header pipe in place.

Figure 9:
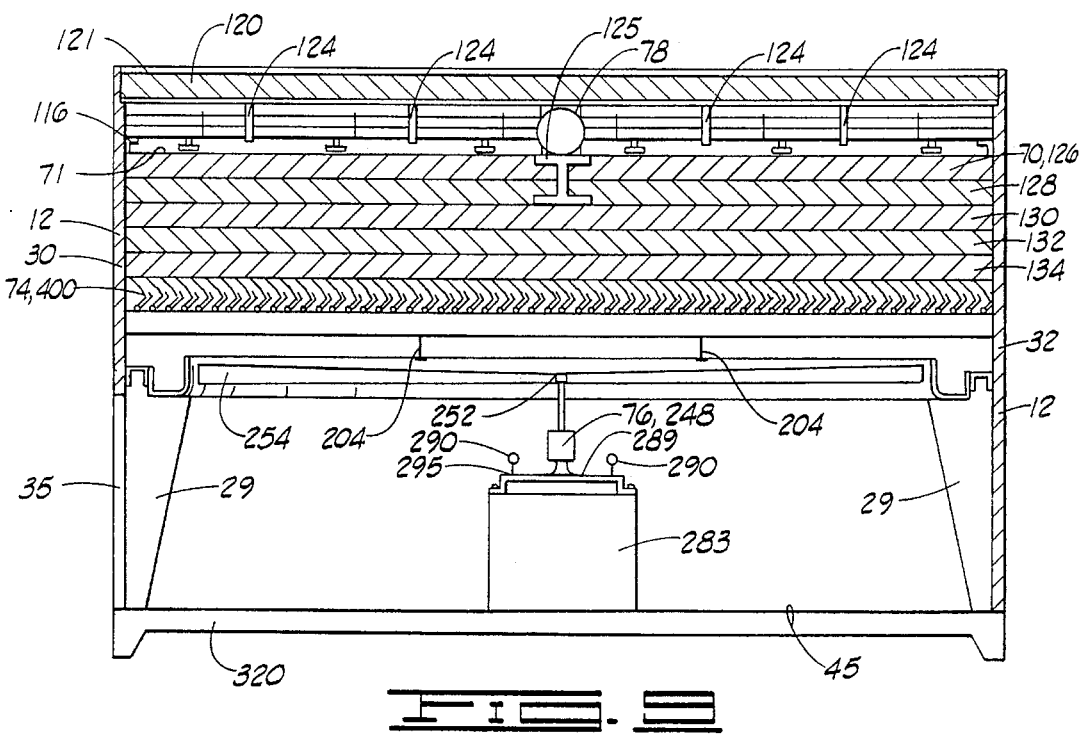
FIG. 9 is a view similar to FIG. 5 oriented at 90° thereto.

The liquid distribution system, as better seen in FIG. 13 further comprises a plurality of longitudinal pipes 88 having nozzles 90 attached thereto and extending downward therefrom. The number of nozzles and longitudinal pipes along with the number of drift eliminators is determined by the size of the cooling tower and the area to be covered with liquid sprayed by nozzles 90. A sufficient number of nozzles should be used to allow coverage of substantially all of the top surface 71 of the fill material 70. In the embodiment shown, which is representative of a 36 foot×36 foot cooling tower, the plurality of pipes 88 includes 12 pipes identified by the numerals 92, 94, 96, 98, 100, 102, 104, 106, 108, 110, 112 and 114. The number of pipes and nozzles will be increased or decreased with the size of the tower. Pipes 92 through 102 extend outwardly from one side of header pipe 78, while pipes 104 through 114 extend outwardly from the opposite side of the header pipe, until the pipes reach the pair of transverse end walls. The longitudinal pipes are held in place by U-bolts 124 which are attached to and extend downwardly from I-beams 121 as better shown in FIG. 8. Each pipe 88 will be held in place by a plurality of U-bolts 124. The longitudinal pipes may also be supported by support clips 116 which may be bolted to the end walls, as shown in FIG. 9. In the embodiment shown, each longitudinal pipe 88 has three (3) distribution nozzles 90 extending downward therefrom, or a total of thirty-six (36) nozzles. The nozzles 90 preferably are constructed in accordance with the teaching of Curtis, U.S. Pat. No. 5,143,657 for Fluid Distributor and Curtis, U.S. Pat. No. 5,152,148 for Automatically Adjustable Fluid Distributor, the details of which are incorporated herein by reference.

Liquid is pumped from a liquid source (not shown) into liquid supply pipe 85 which carries the liquid to header pipe 78. Header pipe 78 communicates the liquid to longitudinal pipes 88, which communicate the liquid to nozzles 90. Nozzles 90 spray or distribute liquid on top of fill material 70.

Fill material 70 is preferably comprised of several layers of fill material. In the embodiment shown, fill material 70 is comprised of five layers designated by the numerals 126, 128, 130, 132 and 134. The fill material is a commercially available, corrugated plastic fill material which preferably is provided in strips one foot wide by one foot thick. The fill material should be of sufficient length to fit snugly between opposed walls, such as side walls 14 and 16 and end walls 30 and 32 and may be trimmed as necessary to provide clearance for header pipe 78 and header pipe support beam 125. The water distributed by the liquid distribution system will trickle or gravitate downward through the fill material and will be collected by the drainage collection system 74.

The liquid collected in drainage collection system 74 is communicated to and received in first and second troughs 54 and 64 respectively. First and second troughs 54 and 64 may therefore be referred to as liquid receiving means 138 operably associated with the first and second longitudinal side walls for receiving liquid from the drainage collection system. The drainage collection system 74 is preferably a dual layered drainage collection system constructed in accordance with the teachings of co-pending U.S. patent application No. 08/240,280, which is assigned to the assignee of the present application, the details of which are incorporated herein by reference. Thus, drainage collection 74 may comprise the dual layered drainage collection system shown in FIG. 14, which is generally designated by the numeral 400. The drainage collection system includes an upper layer 402 of parallel, elongated collection plates 404. It includes a lower layer 406 of parallel elongated collection plates 408.

Each of the collection plates 408 of lower layer 406 is a hollow, double-walled plate having an upper wall 410 and a lower wall 412. An interior 414 is defined between the walls 410 and 412. The lower plate 408 has an upper opening 416 communicated with the interior 414.

Each of the upper plates 404 has a lower edge 418 which overlaps with an upper edge 420 of upper wall 410 of a lower plate 408. The lower edge 418 of each upper plate 404 drains liquid from the upper plate 404 through the opening 416 and thus into the interior 414 of the double-walled lower plate 408.

The upper opening 416 of each of the lower collection plates 408 can be described as an elongated opening which extends along the length of the plate 408 and which is defined by a spacing 422 between the upper and lower walls 410 and 412. The spacing 422 extends transversely away from the lower edge 418 of upper plate 404 which drains into the opening 416, thus effectively increasing the overlap between adjacent ones of the upper plates 404 and significantly decreasing the amount of spray which can splash from one plate 404 over onto the adjacent lower plate 408.

Figure 14:
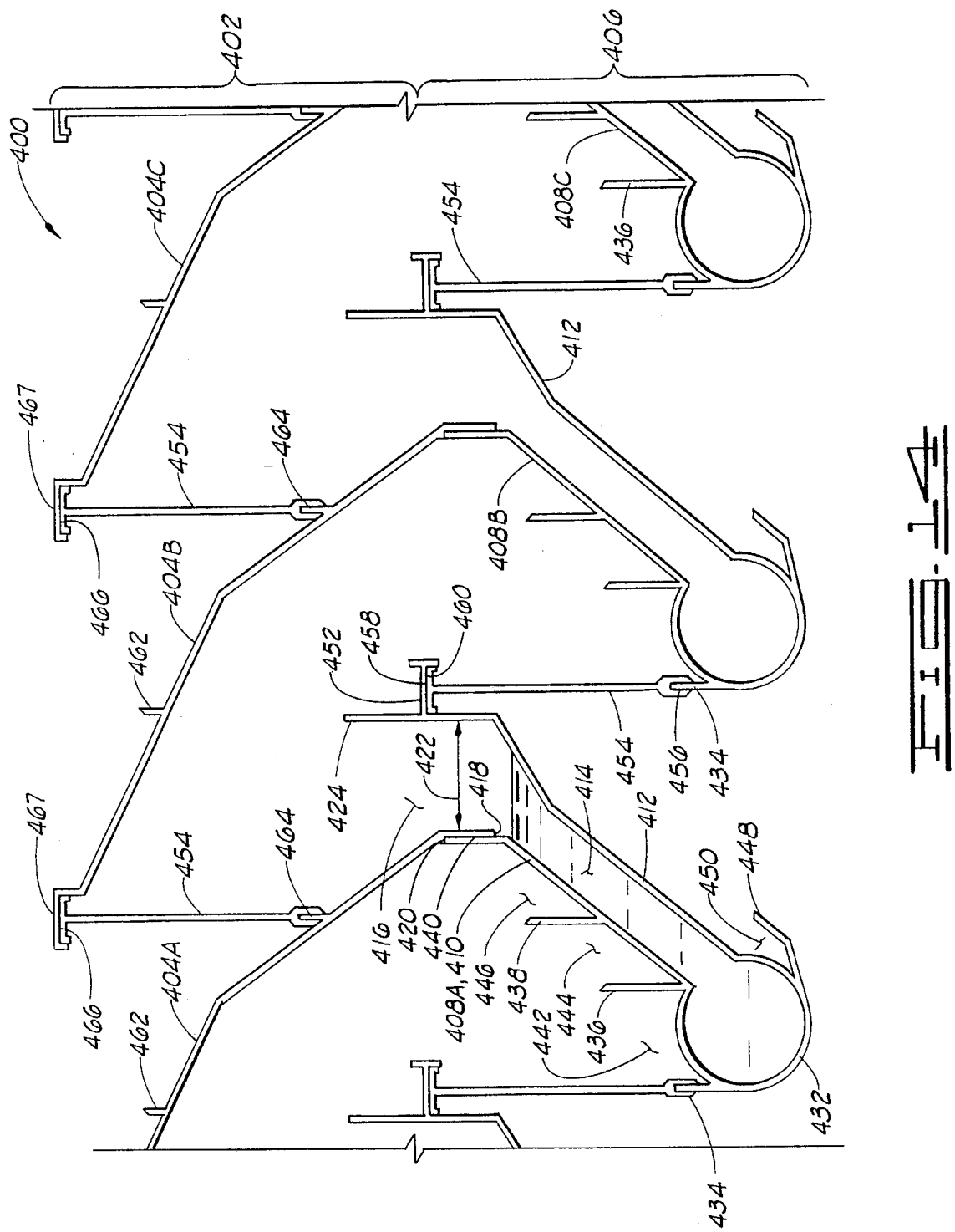
FIG. 14 shows a portion of the drainage collection system of the present invention.

For example, with reference to FIG. 14, the upper plates 404 have been individually designated as 404A, 404B, and 404C, while the lower plates 408 have similarly been indicated as 408A, 408B, and 408C for ease of individual identification. The water which falls on upper plate 404A will primarily collect by running transversely across the width of plate 404A into the upper opening 416 of lower plate 408A. Any water which splashes off the upper surface of upper plate 408A must splash to the right entirely past the opening 416 and over an upper lip 424 of lower wall 412 of plate 408A, before it can fall upon the upper surface of the next adjacent lower plate 408B. As will be apparent in viewing FIG. 14, the spacing 422 of the opening of lower plate 408A effectively serves as an increase in transverse width of the upper plate 404A thus effectively increasing the overlap between adjacent ones of the upper plates 404 thus greatly decreasing the amount of overspray which will ever reach the outer surface of the upper walls such as 410 of any of the lower plates 408. Lower layer 406 has first and second ends 426 and 427 respectively, while upper layer 402 has first and second ends 428 and 430, respectively.

Each of the lower collection plates 408 has an enlarged generally cylindrical-shaped lower portion 432. Three vertical flanges 434, 436 and 438 extend upward from the upper surface of upper wall 410. A fourth upward extending flange 440 extends to the upper edge 420. Flange 440 overlaps with the lower portion of upper plate 404 and the two are cemented or otherwise bonded together.

A plurality of channels, 442, 444, and 446 are defined between the flanges 434, 436, 438 and 440. These channels collect any overspray which falls upon the upper surface of upper wall 410 and drain it longitudinally along the length of lower plate 408.

Near the lower edge of lower plate 408 there is a lip 448 defining a channel 450 for catching any water which might condense on the back side of the lower wall 412 and run down along lower wall 412. The lower wall 412 has a vertically extending portion ending in the upper edge 424 previously defined, and has a horizontally outward extending support flange 452 extending therefrom. A T-shaped support column 454 has a U-shaped lower end 456 received over the flange 434, and has a cross piece 458 at its upper end which is received within a channel 460 defined in the lower surface of support flange 452.

The support column 454 is shown in cross section in FIG. 14 and typically has a width into the plane of the sheet upon which FIG. 14 is drawn of perhaps two inches or so. As is apparent in FIG. 14, there are a plurality of such support columns which are used to assemble the upper and lower layers 402 and 406.

Each of the upper plates has first and second short upwardly extending ribs 462 and 464 defined thereon. At its upper edge, each of the upper plates 404 has a downwardly open channel 466 defined therein. Channel 466 includes an upper surface 467 defined thereon.

Another of the T-shaped support columns 454 extends between each rib 464 and the channel 466 located immediately thereabove. Thus, the entire drainage collection system 400 may be made up of assemblies of three different extruded PVC plastic sections, namely the upper plates 404, the lower plates 408, and the T-shaped support columns 454.

The body of fill material 70 rests on and is supported by the upper surface 467 of the upper layer of parallel elongated collection plates 404. The length of the collection plates is such that first and second ends 426 and 427 of lower layer 406 are positioned over first and second troughs 54 and 64 respectively. In other words, end 426 is located above trough 54 between vertical leg portion 50 of leg 48 and wall 14. Likewise, end 427 is positioned over trough 64 between vertical leg portion 60 of leg 50 and wall 16. The upper layer of collection plates is longer than the lower layer, so that ends 428 and 430 are likewise positioned over troughs 54 and 64, respectively. Liquid received in the drainage collection system will therefore be dumped out ends 426 and 428 into first trough 54, and will be dumped out ends 427 and 430 into second trough 64.

The liquid received in troughs 54 and 64 will flow in a direction from rear end 7 to forward end 6. Liquid is thus directed to exit wall 32, where it passes through, or flows out of exit openings 66. Troughs 54 and 64 thus comprise a directing means for directing liquid to exit openings 66.

Figure 15:
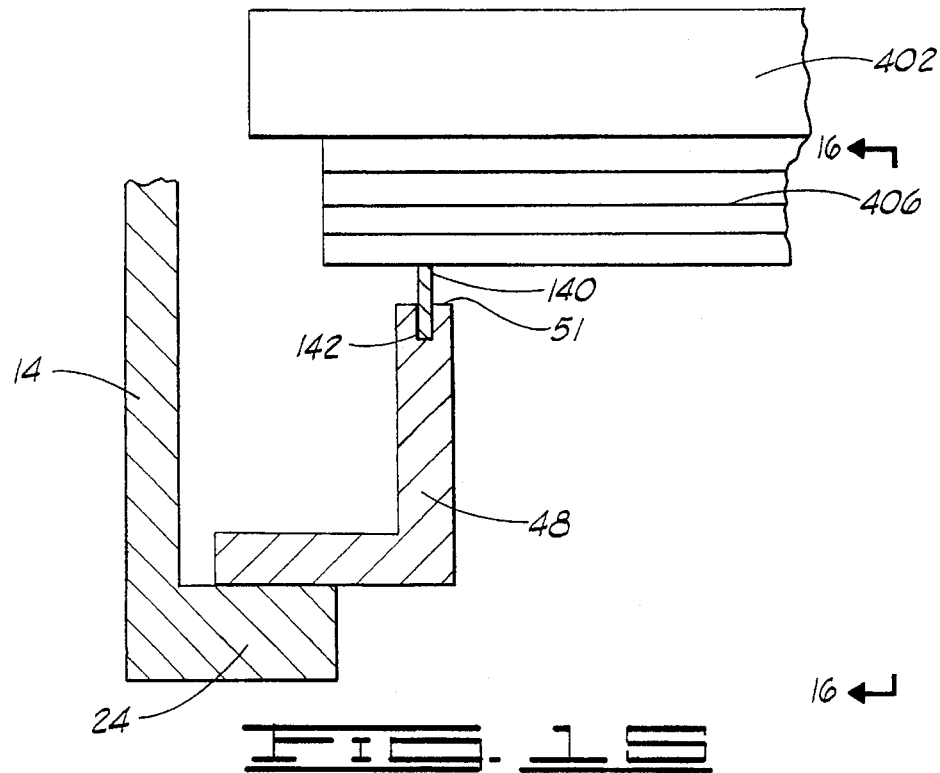
FIG. 15 is an elevation section partially schematic view showing the support for the drainage collection system.
Figure 16:
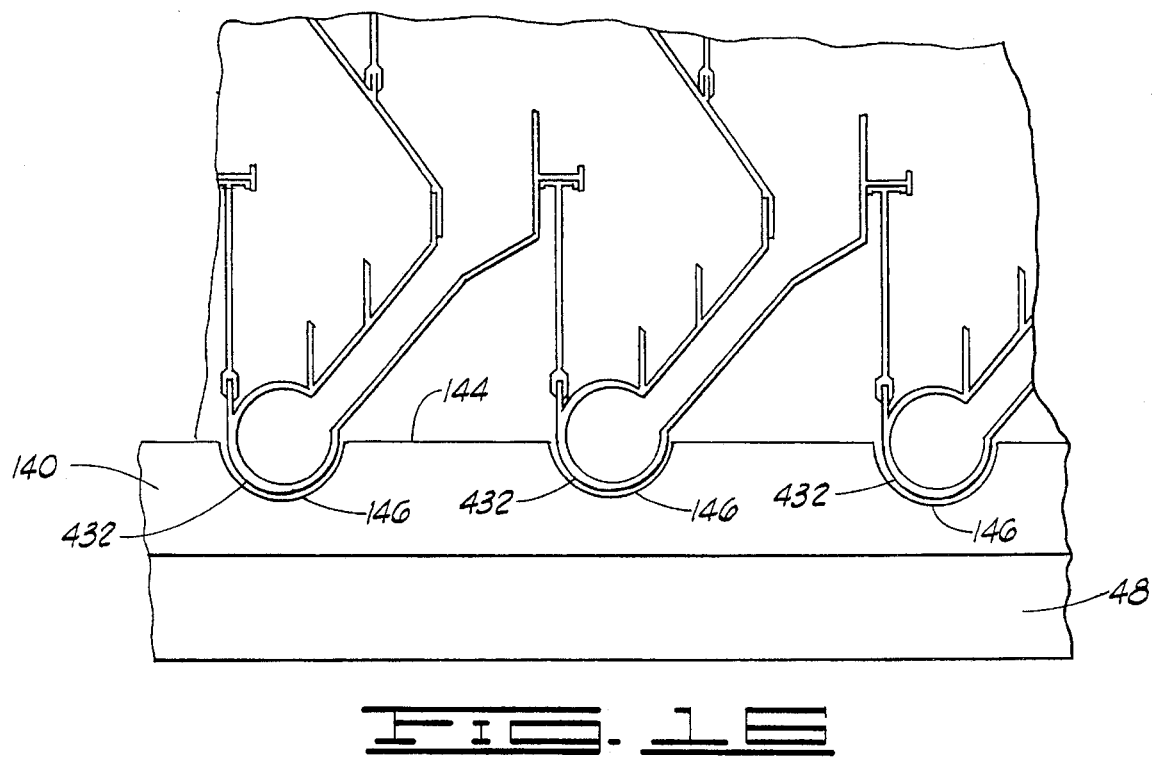
FIG. 16 shows a view taken from line 16—16 shown on FIG. 15.

The drainage collection system is supported by a pair of drainage collector supports 140, which extend upwardly from the upper ends 51 and 61 of vertical leg portions 50 and 60 respectively. The drainage collection supports may be received in grooves 142 defined in the upper ends of the vertical leg portions, as better shown in FIG. 15. As shown therein, the lower portion 432 of parallel elongated collection plates 408 rests on and is supported by an upper end 144 of the pair of drainage supports 140. As shown in FIG. 16, the upper end 144 of supports 140 preferably has a plurality of semi-circular openings 146 defined therein for receiving the lower portion 432 of the collection plates 400. Flanges 434 and 448 on the lower collection plates may be trimmed back as necessary to allow the lower portion 432 thereof to be received in semi-circular openings 146.

The drainage collection system is also supported by a framing network 200. The framing network includes a longitudinal center beam 202 which substantially spans the full length of the apparatus between the transverse end walls. The center beam 202 has a lower surface 201, an upper surface 203, a rear end 210 and a forward end 212. The center beam 202 is preferably, but is not limited to, a concrete beam. Longitudinal center beam 202 rests is supported by a pair of opposed U-shaped support channels 150 which are attached to the rear and forward walls 30 and 32 respectively. The channels 150 comprise a rear support channel 152 and a forward support channel 154. Channel 152 extends forward from rear end wall 30, while channel 154 extends rearward from forward end wall 32. Thus, rear end 210 of beam 202 is received in channel 152, while forward end 212 is received in support 154. Supports 152 and 154 may be bolted or otherwise connected to walls 30 and 32 respectively, and are substantially directly opposed, so that beam 202 will be substantially horizontal when it is received in the channels.

The framing network may also include a plurality of transverse I-beams 204 and a plurality of longitudinal I-beams 206. Transverse I-beams 204 and longitudinal I-beams 206 are preferably, but are not limited to, fiberglass I-beams. In the embodiment shown, there are four transverse I-beams 204. Transverse I-beams 204 are connected at one end to a trough leg and at a second end to the longitudinal center beam. As shown in FIG. 12 the transverse I-beams 204 may be connected to the first and second troughs and to longitudinal center beam 202 with bolted angles 208. The connection at the center beam may include sleeves 209 extending through the beam 202, so that a bolt extending through the beam 202 can be used to attach the beams 204.

The embodiment shown also includes four longitudinal I-beams 206, two each located on either side of longitudinal center beam 202. As shown in FIG. 11, the ends of the I-beams 206 are connected to transverse end walls 30 and 32 using a bolted angle 214. The I-beams 206 may likewise be bolted or otherwise connected to the longitudinal I-beams 204 where beams 206 pass over beams 204. The longitudinal I-beams 206 have an upper surface 216 which is co-planar with upper surface 203 of longitudinal center beam 202. The lower portion 432 of collection plates 408 rests on surfaces 203 and 216, so that the drainage collection system is supported in part by framing network 200.

Fan 76 is located below framing network 200 and blows air upward through fill material 70 as water gravitates downward therethrough. The fan 76 may be mounted on a fan pedestal 240, which extends upwardly from ground surface 45 and is positioned substantially at a center 244 of the cooling tower apparatus. The fan 76 is comprised of a motor 246 and a gear box 248 connected to the motor. The fan further includes a rotor shaft 250 extending upwardly from gear box 248 which has an upper end 252. A rotor 254 is attached to the upper end of the rotor shaft. Rotor shaft 250 extends upwardly past lower end 11 of the four sided enclosure 5 so that the rotor 254 is located within the enclosure.

Figures 17, 17A:
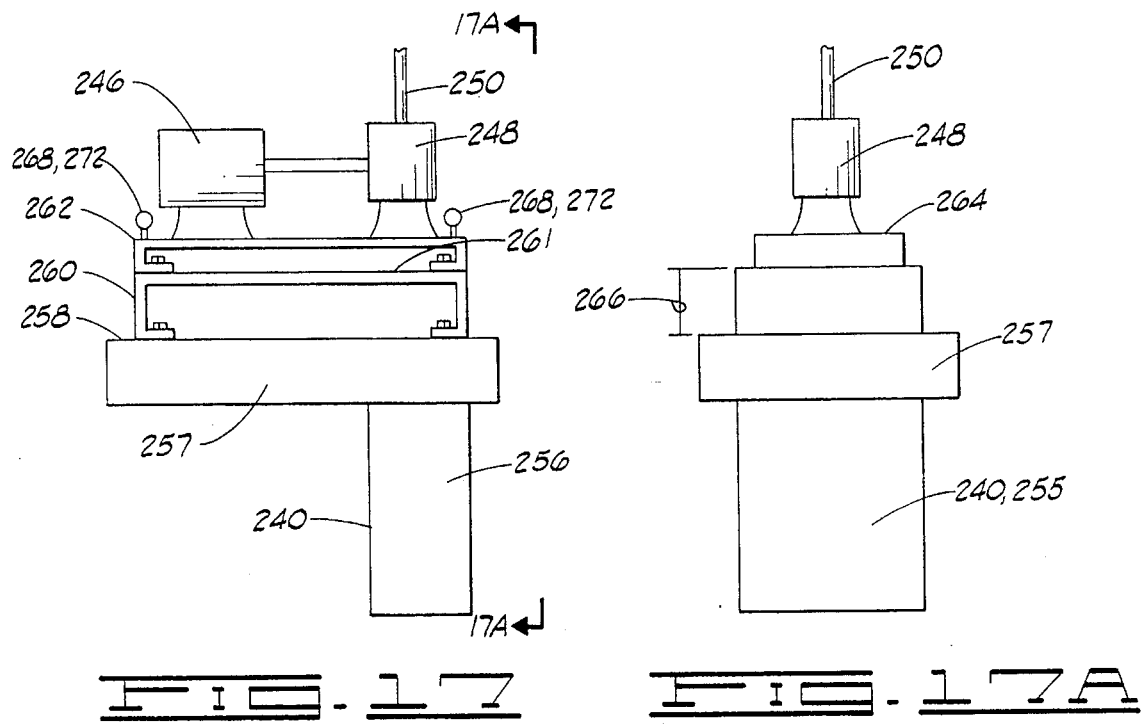
FIGS. 17 and 17A show an alternative embodiment of the fan pedestal of the present invention.

The fan pedestal 240 may comprise an adjustable height fan pedestal, as shown in FIGS. 17 and 17A, wherein the height of the fan pedestal is capable of being lowered so that fan rotor 254 can be lowered below the lower end of the enclosure. Because the pedestal is adjustable, the fan rotor may be lowered below the enclosure without removing the blades, making fan maintenance a much easier task than would otherwise be possible. If the pedestal were not adjustable, the blades would have to be removed while still in the enclosure. Only when the blades were removed could the fan be moved from the pedestal for maintenance purposes. Adjustable height fan pedestal 240 includes a mounting pedestal 255 comprised of a vertical column portion 256 and a mounting portion 257 having an upper, or mounting surface 258 defined thereon. Adjustable pedestal 240 further includes a removable mounting bracket 260 attached to mounting surface 258. The removable mounting bracket 260 is releasably attached to mounting surface 258 with bolts or other connectors. Bracket 260 has an upper surface 261 and a vertical height 266. An upper mounting frame, or lifting frame 262 is releasably connected to upper surface 261 of the bracket 260 with bolts or other means. The fan motor 246 and fan gear box 248 are attached to a top 264 of the lifting frame.

The apparatus further includes a lifting or suspending means 268 so that the fan may be lifted while the adjustable height pedestal is lowered. The lifting means includes a lifting ring 270 threaded into or otherwise connected to and extending downwardly from longitudinal center beam 202. The lifting means further includes a plurality of upwardly extending lifting rings 272 structurally attached to lifting frame 262. A chain or cable (not shown) can be attached to lifting rings 270 and 272, and can be used in combination with a hand wench or come-along (not shown) to raise lifting frame 262 along with fan 76 off of the pedestal. To adjust the fan height, the removable mounting bracket 260 is simply removed by removing the bolts or other means of attachment. Lifting frame 262 can be lowered so that the frame 262 rests on and is supported by mounting surface 258. The height 266 of mounting bracket 260 is such that when bracket 260 is removed, the fan rotor 254 moves below the lower end of the enclosure, making fan maintenance easier than would otherwise be possible.

Figures 32, 33:
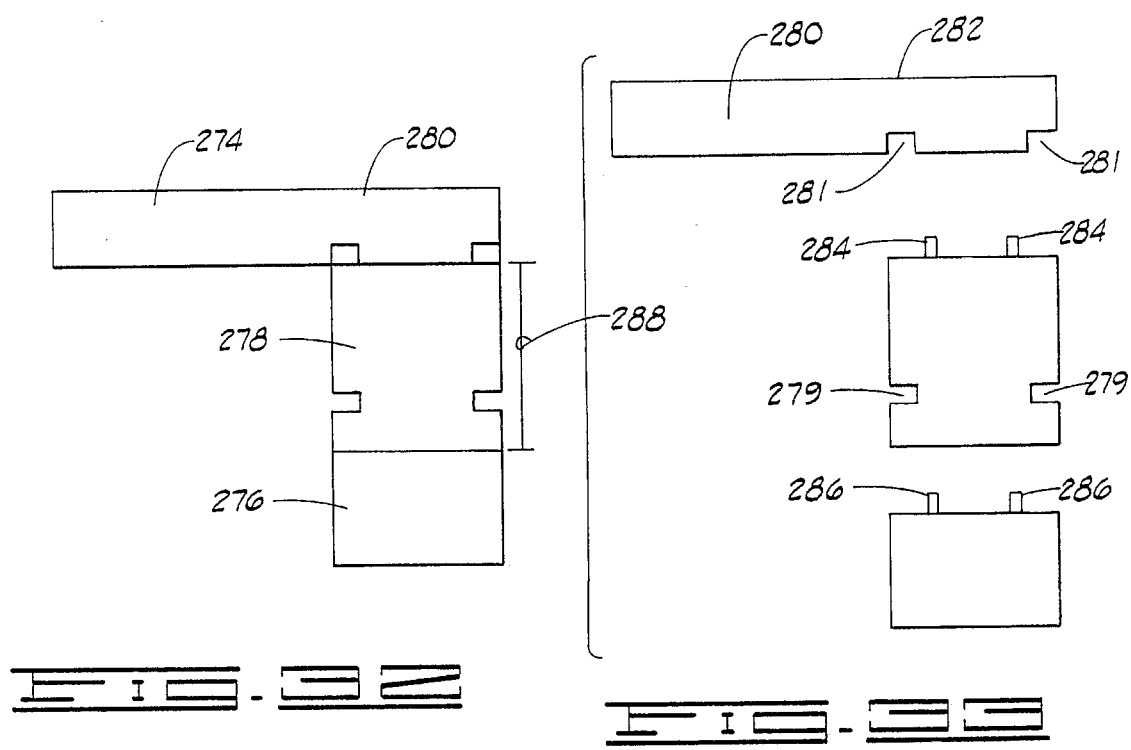
FIGS. 32 and 33 show an additional embodiment of the fan pedestal of the present invention.

Alternatively, the fan pedestal may comprise a sectioned fan pedestal 274 as shown in FIGS. 32 and 33. Sectioned fan pedestal 274 includes a lower section 276, a center section 278 and an upper mounting section 280. Upper section 280 has a mounting surface 282 defined thereon, The lifting frame 262 may be mounted directly to upper surface 282 or may be attached to a mounting bracket 260 as previously described.

In the alternative embodiment shown in FIGS. 32 and 33, the center section 278 has a plurality of structurally attached dowel pins 284 extending upwardly therefrom which are received in a plurality of mating holes defined in the upper portion 280 (not shown). Likewise, lower section 276 has a plurality of structurally attached dowel pins 286 extending upwardly therefrom which are received in a plurality of mating holes (not shown) defined in the center section 278. After the fan is lifted off of upper section 280, section 280 is lifted from section 278 utilizing a forklift or other mechanical means. Thus, section 280 may have a pair of slots 281 defined therein for receiving the forks of a forklift or other mechanical lifting means. Likewise, the center section may include slots 279 for receiving the forks of a forklift or other mechanical lifting means. After upper section 280 is removed, center section 278 is removed and upper section 280 is placed on lower section 276, so that upwardly extending dowels 286 will be received in the mating holes defined in upper portion 280. The fan can then be lowered so that lifting frame 262 will rest on mounting surface 282. The center section has a height 288 sufficient such that when it is removed and the fan is lowered, fan rotor 254 will be lowered below the lower end of the enclosure.

Finally, as shown in FIG. 4, fan pedestal 240 may comprise a pedestal 283 comprised of two vertical support columns 292 and 294 having upper ends 291 and 293 respectively. A removable mounting plate 295 spans between and is attached with bolts or other connectors to the upper ends 291 and 293 of vertical support columns 292 and 294 respectively. Gear box 248 and motor 246 are attached to an upper surface 289 of mounting plate 295. A pair of lifting rings 290 are attached to and extend upwardly from mounting plate 295. To lower fan 76, mounting plate 295 is disconnected from columns 292 and 294. A chain or cable is attached to lifting rings 270 and 290 and the mounting plate and fan 76 are lifted off of vertical columns 292 and 294. Mounting plate 295 is rotated to clear the vertical columns, and lowered so that it rests on the ground. Thus, the fan rotor is withdrawn from the enclosure, and maintenance on the fan can be performed.

The apparatus further includes a fan shroud 300. Fan shroud 300 includes an outer leg 302 and an inner leg 304 having an upper end 303. As shown in FIGS. 17 and 18, the shroud is attached at the rear and forward ends of the apparatus to walls 30 and 32, and is connected at the sides to opposed trough legs 48 and 56. Outer Leg 302 may be attached to trough legs 48 and 56 using an angle 305 which is bolted or otherwise attached to the vertical portion of the trough leg. A bolt can then be placed through an inwardly extending lip 306 of angle 305 and threaded into the upper end of outer shroud leg 302.

At the forward and rear ends, outer leg 302 may be connected to a channel 297 which is in turn connected to walls 30 and 32. Channel 297 has downwardly extending legs 296 and 298. Outer shroud leg 302 is connected to leg 296 with bolts or other fasteners. Leg 298 is attached to the transverse end walls with bolts which are received in threaded inserts (not shown). The shroud 300 is connected as shown and described herein at a plurality of locations to each trough leg and each end wall.

Figure 34:
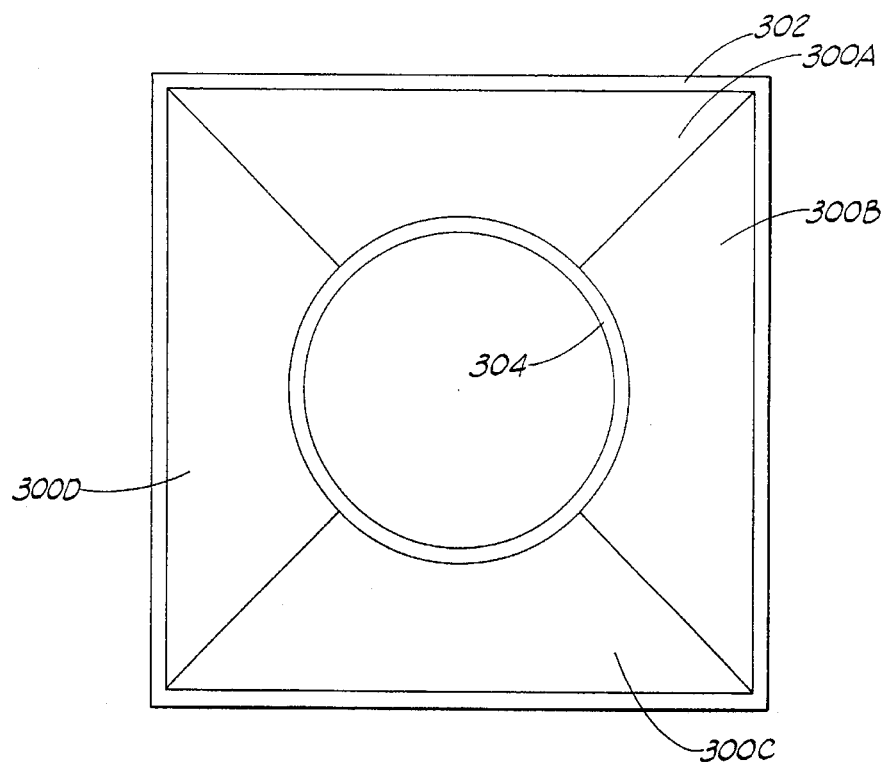
FIGS. 34 and 35 show additional embodiments of the fan shroud of the present invention.
Figure 35:
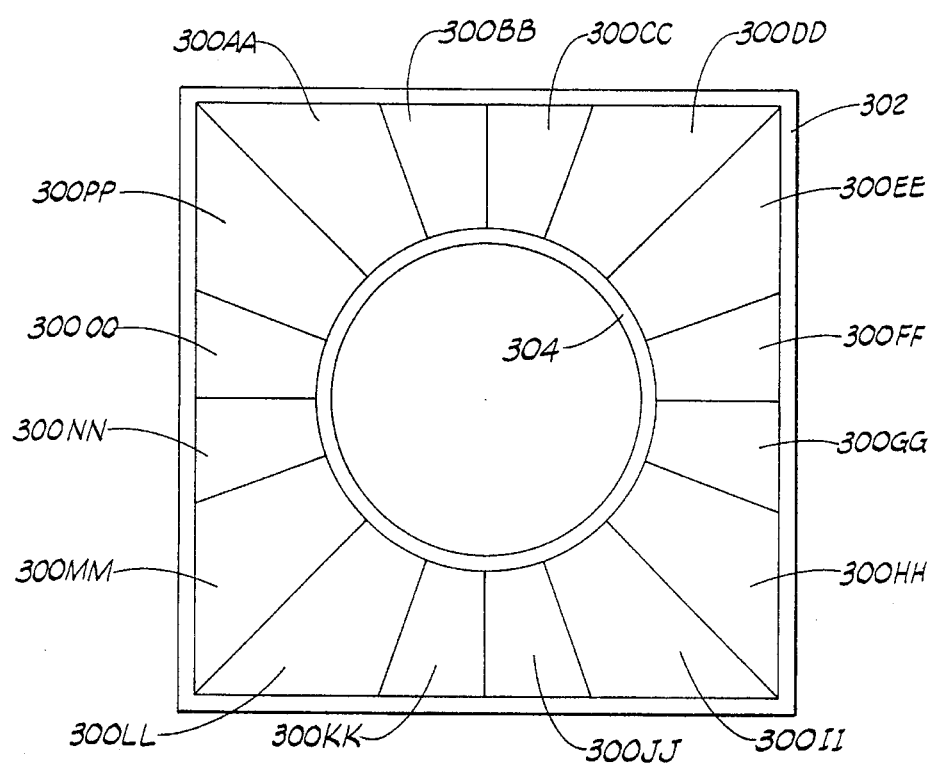

Shroud 300 may also connected to longitudinal I-beams 206 and transverse I-beams 204. Where the shroud passes under I-beams 204 and 206, a bracket 307 having a hook or U-bolt 308 extending downwardly therefrom is attached to the beams. At those locations, upper end 303 of inner leg 304 has an upwardly extending mounting hook or eyebolt 309 threaded therein. Adjustable turnbuckles 310 and 311 may be connected to hook 308 and eyebolts 309 to connect the shroud to transverse I-beams 204 and longitudinal I-beam 206 respectively. Shroud 300 may be of any suitable material, such as, but not limited to, fiberglass or concrete and may, as shown in FIGS. 34 and 35, be comprised of separate shroud sections. FIG. 34 shows a shroud comprised of four sections, designated sections 300A, 300B, 300C and 300D. FIG. 35 shows a shroud comprised of sixteen (16) sections, designated as sections 300AA–300PP. The sections of the fan shroud are attached to the end walls and trough legs as described above.

As shown in FIG. 1, the invention may further include a reservoir 312 located adjacent the cooling tower apparatus.

Figure 2:
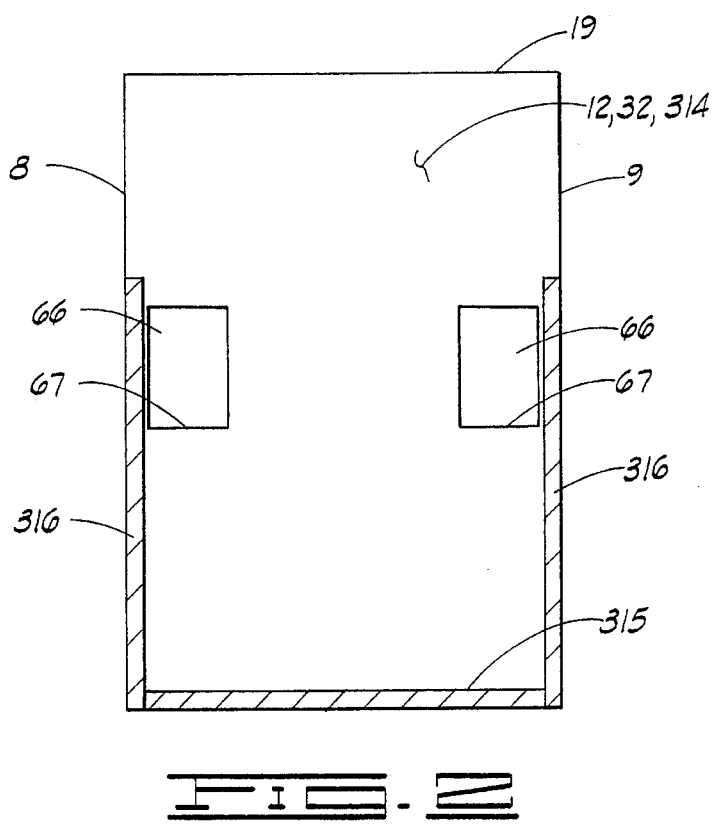
FIG. 2 is a section view taken from line 2—2 on FIG. 1.

The reservoir is a four sided enclosure which has, as better seen in FIG. 2, a pair of transverse reservoir end walls 314, a pair of longitudinal reservoir side walls 316, and a floor 315. As described previously, exit wall 32 of the apparatus 1 extends upwardly from the ground surface. Reservoir side walls 316 extend forward from wall 32 so that one of the pair of transverse end walls 314 is defined by exit wall 32. In other words, wall 32 is a common wall which comprises the exit wall for the cooling tower apparatus 1 and which comprises an entrance wall for the reservoir 312. Because the rear end of the apparatus is closed, liquid received in first and second troughs 54 and 64 will be directed to common wall 32. The liquid will pass through exit openings 66 and will be dumped into reservoir 312. A pump 330 is attached to the reservoir and will circulate liquid from the reservoir. The liquid circulated out of the reservoir may ultimately be communicated back to the liquid supply pipe 85. The circulating pump may also be utilized to simply draw liquid from the reservoir and to pump it immediately back into the reservoir through a pipe 325 as schematically shown in FIG. 1, so that liquid in the reservoir is constantly circulating. The purpose of circulating the fluid is to eliminate the possibility of freezing during cold winter months and when the cooling tower is not operating.

The cooling tower apparatus of the present invention may be constructed utilizing tilt-up construction or by utilizing pre-fabricated panels. Tilt-up construction is a known type of construction that utilizes a concrete slab, which may also be used as a foundation for the structure being built, as the back side of a mold upon which the walls are formed. Thus, with the present invention, each wall of the apparatus may be formed using a substantially horizontal concrete slab 320 as the back side of a mold.

As provided herein, the transverse end wall 30 along with downwardly extending legs 35 are preferably integrally cast as one piece. Likewise, the first and second longitudinal side walls and their respective downwardly extending legs are preferably integrally formed as one piece. Thus, the apparatus of the present invention may be constructed by forming the rear end wall on the concrete slab and tilting the rear end wall up utilizing a crane or other means so that it stands on its legs in a substantially vertical position. The first and second horizontal end walls are also formed utilizing the concrete slab as the back side of the mold. Once the walls are formed, they are tilted up to a substantially vertical position. The forward end wall can likewise be formed utilizing the concrete slab as a mold. The four sided enclosure of the cooling tower apparatus is completed by simply tilting the forward end wall up, positioning the walls to form the enclosure, and connecting the four walls.

The walls of the reservoir can likewise be formed utilizing the slab as the mold. Each individual wall of the reservoir may then be tilted up to substantially vertical position. In other words, the end wall 314 opposed from forward wall 32, along with longitudinal walls 316 of the reservoir can be formed and tilted up and put in place prior to forming and tilting exit wall 32, so that the entire structure, including the cooling tower apparatus and the reservoir 312, may be constructed utilizing tilt-up construction. Once the walls have been erected the tower can be completed by locating and installing the troughs at the lower ends of the side walls, and installing the drainage collection system, the fill material, the liquid distribution system, and other components. The tower may also be built utilizing pre-fabricated walls and separately pre-fabricated legs which are shipped to a construction site.

Although tilt-up construction is a known type of construction, it is believed that tilt-up construction has not before been utilized in the construction of concrete cooling towers due to either the shape or the size of such towers. There are two known types of concrete cooling towers. The first is a natural draft, hyperbolic tower which has a hyperbolic shape making the use of tilt-up construction impractical.

The second type of concrete cooling tower is an induced draft cooling tower which has the fan located on the top of the tower. The walls of such towers must be sufficiently thick to support not only their own weight, but to support the fan and the platform on which the fan must rest. The walls of such towers are so thick, and thus so heavy that tilt-up construction is simply not feasible. Such cooling towers are often cost prohibitive, and take on the order of several months to more than a year to construct. The present invention eliminates that problem by positioning the fan beneath the tower so that the weight to be supported by the walls of the tower is significantly decreased as compared to other towers. Because the tower of the present invention can be built using tilt-up construction, the costs of such a tower is reasonable and competitive with the costs for building other towers. Further, such a tower can be constructed in several days, as opposed to several months.

Figure 22:
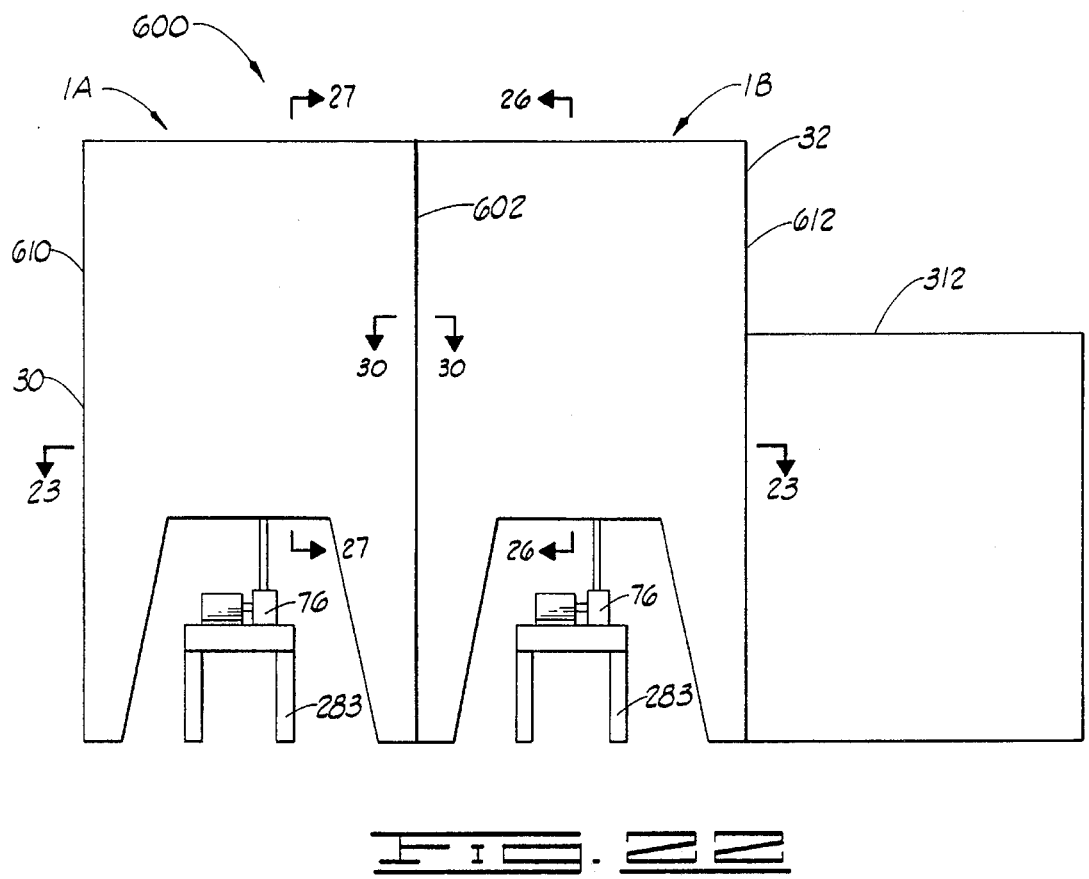
FIG. 22 is a schematic of a modular cooling tower construction of the present invention.

The present invention further includes a modular cooling tower construction comprised of a first cooling tower apparatus and at least one additional cooling tower apparatus in combination therewith. Thus, the invention includes a modular cooling tower construction as shown in FIG. 22, which is generally designated by the numeral 600. The modular cooling tower construction shown there includes a first and second cooling tower apparatus joined in series. The first cooling tower apparatus is substantially similar to cooling tower apparatus 1 hereinbefore described and is generally designated by the numeral 1A. The second cooling tower apparatus is likewise substantially similar to the apparatus 1 and is substantially similar to first cooling tower apparatus 1A and will be designated by the numeral 1B.

Cooling tower apparatus 1A includes first and second longitudinal walls 14A and 16A having first and second troughs 54A and 64A defined at the lower ends respectively thereof. First and second troughs 54A and 64A comprise liquid receiving means 138A for receiving liquid passing downward through apparatus 1A. When the subscript A or B is used with respect to any particular feature of the apparatus 1A and 1B, the subscript is used for purposes of identification and not to indicate any distinction between the elements or features of apparatus 1 and apparatus 1A. Thus, when such a subscript is used, the elements themselves are substantially identical to the same element as described with respect to the cooling tower apparatus 1.

Walls 14A and 16A are parallel and have a space 15A defined therebetween. Cooling tower 1B likewise includes first and second longitudinal walls 14B and 16B having first and second troughs 54B and 64B respectively. Walls 15B and 16B are parallel and have a space 15B defined therebetween. Apparatus 1A and 1B are connected at a joint 602 and are arranged longitudinally in series so that first and second troughs 54A and 64A and first and second troughs 54B and 64B are connected to form first and second substantially continuous liquid passageways 604 and 606 respectively. The first and second troughs of first apparatus 1A are thus aligned with and in fluid communication with the first and second troughs of second apparatus 1B, and the liquid receiving said means 138A of first cooling tower apparatus 1A is in direct fluid communication with liquid receiving means 138B of the second cooling tower apparatus.

The modular cooling tower construction has a first, or rear end 610 and a forward, or exit end 620. A transverse end wall 30 is located at rear end 610. A forward end wall, or exit wall 32 is located at the forward end 620. Thus, the rear end of the modular cooling tower construction is as seen in FIGS. 4 and 5, and the forward end is as seen in FIGS. 3 and 6. As described previously forward end wall 32 includes a pair of exit openings 66. A transverse partition wall 622 is located at joint 602. Transverse partition wall 622 will fit between the longitudinal side walls. Transverse partition wall 622 has an upper end 624, a lower end 626, a forward facing surface 628 and a rear facing 630. Transverse partition wall 622 has a pair of legs 632 extending downwardly from the lower end 626 thereof. As shown in FIG. 27, transverse partition wall 622 has a pair of transversely opposed trough supports 634 extending rearward from rear facing surface 630. Trough supports 634 may comprise a first, or left trough support 636 and a second, or right, trough support 638, which are substantially directly opposed from trough supports 37 and 38 respectively defined on rear end wall 30. Rear and forward ends 52A and 53A of L-shaped trough leg 48A are thus received in and supported by first trough support 37 defined on rear wall 30 and first trough support 636 defined on transverse partition wall 622 respectively. Rear and forward ends 62A and 63A of second trough leg 56A of the apparatus 1A will be received in and supported by second trough support 38 on end wall 30 and second trough support 638 on transverse partition wall 626 respectively.

As shown in FIG. 26, transverse partition wall 622 further comprises a pair of forward facing trough supports 640 which extend forward from forward facing surface 628. Trough supports 640 may be comprised of a first trough support 642 and a second trough support 644 which are substantially directly opposed from first and second forward trough supports 41 and 42 respectively defined on forward end wall 32. Rear and forward ends 52B and 53B of first trough leg 48B of the apparatus 1B will be received in and supported by trough supports 642 and 41 respectively. Likewise, the rear and forward ends 62B and 63B of second L-shaped trough leg 56B will be received in and supported by trough supports 644 and 42 respectively. Trough supports 636, 638, 642 and 644 may be integrally cast as part of wall 622. Alternatively, the supports may comprise substantially L-shaped angles which are bolted or otherwise connected to wall 622. Transverse partition wall 622 further includes a pair of windows or exit openings 646 which comprise a first or left opening 648 and a right or second opening 650. Windows 648 and 650 have lower edges 647 and 649 respectively, which are substantially coplanar with the upper surfaces 55 and 65 of the bottom portion of the trough legs of each apparatus. Thus, windows 648 and 650 are located such that liquid received in troughs 54A and 64A will pass through windows 648 and 650 respectively into troughs 54B and 64B respectively. Thus, the troughs are in direct fluid communication with one another and form substantially continuous liquid passageways 604 and 606 as previously described above.

Transverse partition wall 622 further includes a U-shaped rear support channel 652 extending rearward from rear facing surface 630, and a U-shaped forward support channel 654 extending forward from forward facing surface 628. The U-shaped channels may be bolted or otherwise connected to wall 622. Longitudinal center beam 202A is received in and supported by channel 152 which extends forward from wall 30 and channel 652 which extends rearward from partition wall 622. Likewise, longitudinal center beam 202B is received in channel 154 which extends rearward from wall 32 and channel 654 which extends forward from partition wall 622.

Transverse partition wall 622 further includes a plurality of notches 658 defined on rear facing surface 630, and a plurality of notches 660 defined on forward facing surface 628 at the upper end 624 thereof. I-beams 121A will be received and held in place by notches 119 in wall 30 and notches 658 in wall 622, while I-beams 121B will be held in place by notches 660 in partition wall 622 and notches 123 in forward wall 30. The transverse partition wall and longitudinal side walls may be connected at joint 602 with plates or angles which may be embedded therein and welded together, or may be attached by any other means known in the art. At joint 602, bolts which extend through wall 622 may be used to attach the I-beams 206 of both apparatus 1A and 1B. For instance, as shown in FIG. 30, at each location where an I-beam 206 is attached to partition wall 622, wall 622 may have sleeves 623 passing therethrough. Sleeves 623 will receive bolts which will pass therethrough, and can be used to attach the I-beams 206 on both sides of transverse partition wall 622.

As described herein, first cooling tower apparatus 1A has an enclosure 5A bounded by transverse walls 30 and 622, and longitudinal walls 14A and 16A. Apparatus 1A is substantially similar to apparatus 1 hereinbefore described, and includes the components and features of the apparatus 1 arranged in substantially the same manner. For example, cooling tower apparatus 1A includes a body of fill material disposed in the enclosure 5A, a liquid distribution system located above the fill material for distributing liquid on top of the fill material, a drainage collection system for collecting the liquid that gravitates downward through the fill material, a framing network, and a fan located below the fill material. Each of these components is substantially identical to those components as described with respect to apparatus 1, and are arranged in substantially identical fashion. The distinction between apparatus 1 and 1A is that the apparatus 1 is bounded by a rear end wall and a forward end wall, while apparatus 1A is bounded by a rear end wall and a transverse partition wall.

Second apparatus 1B has an enclosure 5B defined by end walls 32 and 622 and longitudinal walls 14B and 16B and, as hereinabove described, is substantially similar to first cooling tower apparatus 1A. The distinction between apparatus 1A and 1B is that the four sided enclosure of 1B is bounded by a forward end wall 32 and a partition wall 622, while apparatus 1A is defined by a rear end wall 30 and a partition wall 622. Each apparatus has its own independent liquid supply pipe. Thus, first apparatus 1A is connected to a liquid supply pipe 85A, while second apparatus 1B is connected to a liquid supply pipe 85B.

Liquid supplied through supply pipes 85A and 85B will be sprayed on top of the fill material of each separate apparatus and will gravitate downward therethrough. The liquid will then be collected in the drainage collection system of each individual apparatus. The liquid collected in the drainage collection system is communicated to and received in first and second liquid passageways 604 and 606 respectively. The liquid flows in a direction from rear end 610 to forward end 620, through openings 646 in partition wall 622, until the liquid exits through exit openings 66 defined in exit wall 32.

The modular cooling tower construction of the present invention further includes a reservoir 312 adjacent the exit wall 32. The reservoir 312, as described above, includes an end walls 314, a floor 315, and longitudinal side walls 316. The reservoir is bounded on one end by exit wall 32 which as described previously, is a common wall which comprises an entrance wall for the reservoir 312. Thus, liquid passing through openings 66 will be received in reservoir 312.

Figure 31:
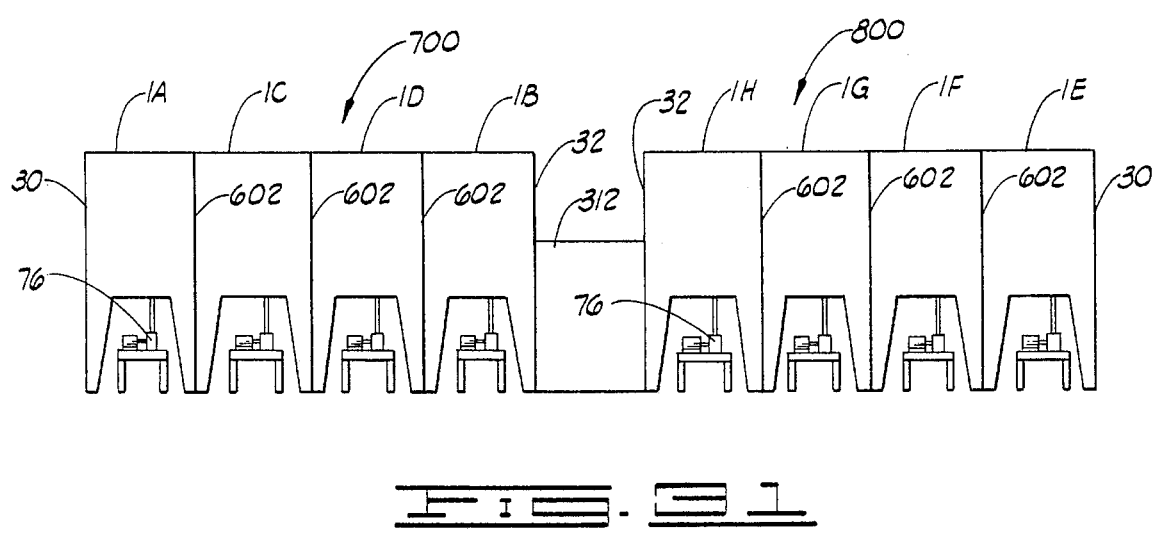
FIG. 31 shows an additional embodiment of the modular cooling tower construction of the present invention.

The capacity of the modular cooling tower construction may be increased simply be adding at least one additional substantially identical cooling tower apparatus arranged longitudinally in series with cooling tower apparatus 1A and 1B so that the modular cooling tower construction includes three (3), four (4) or any number of cooling tower apparatus desired. For instance, as shown in FIG. 31, modular cooling construction 700 may include cooling tower apparatus 1A, 1B, 1C and 1D arranged longitudinally in series, as described above, so that the first and second troughs of each cooling tower apparatus are connected to form the first and second substantially continuous liquid passageways. Thus, the first and second troughs of the at least one additional cooling tower apparatus will be aligned with and in fluid communication with the first and second troughs of the first and second cooling tower apparatus.

In the embodiment shown in FIG. 31, apparatus 1A may be referred to as a rear end apparatus, while apparatus 1B may be referred to as a forward end apparatus. Apparatus 1C and 1D may be referred to as center or intermediate apparatus. As described above, cooling tower apparatus 1A is substantially similar to the cooling tower apparatus 1, and cooling tower apparatus 1B is substantially similar to apparatus 1A. Likewise, the at least one additional cooling tower apparatus, which in the embodiment shown includes apparatus 1C and 1D, are substantially similar to apparatus 1A. As provided herein, each apparatus in the modular cooling tower construction includes a body of fill material, a liquid distribution system, a drift eliminator, a drainage collection system, a framing network and a fan. The features of each apparatus are substantially identical to those features described with respect to the apparatus 1 and are arranged substantially identically.

A transverse partition wall 622 is located at each joint 602, while end walls 30 and 32 are located at rear and forward ends 610 and 620 respectively. The water received in the liquid passageways will exit the modular cooling tower construction at exit wall 32 and will be received in the reservoir 312. As is obvious from the drawings and the previous discussion, the longitudinal center beam 202 of an enclosure bounded by two partition walls will be received in and supported by a forward facing U-shaped channel 652 on one wall 622 and a rear facing channel 654 on the opposed partition wall 622. Likewise, the trough legs 48 and 56 in an intermediate, or center apparatus will be supported at the rear ends thereof by forward facing trough supports 640 and at the forward end thereof by rear facing trough supports 634. The I-beams 121 which hold the drift eliminators will be received in the notches 660 on one partition wall and the notches 658 on the opposed partition wall. The distinction between apparatus 1A, and apparatus 1C and 1D, is simply that the four sided enclosures of apparatus 1A is bounded by a rear end wall, a partition wall, and two longitudinal side walls, while the enclosures of apparatus 1C and 1D are bounded by two opposed partition walls and two longitudinal side walls.

The invention may further include a second modular cooling tower construction 800 substantially identical to first modular cooling tower construction 700. The second modular cooling tower construction may include cooling tower apparatus 1E, 1F, 1G and 1H, and may be arranged so that exit walls 32 of the first and second modular cooling tower construction are directly opposed. The reservoir 312 is positioned between the first and second modular cooling tower construction adjacent the exit walls 32 of constructions 700 and 800. The reservoir will be comprised of two longitudinal side walls 316, and will be bounded at both ends by the exit walls 32 of the first and second modular cooling tower construction, which will be common walls comprising reservoir entrance walls at both ends of the reservoir. Thus, the reservoir will receive liquid exiting through the exit walls of both modular cooling tower constructions. The modular cooling tower construction of the present invention may thus include any number of cooling tower apparatus.

The cooling tower apparatus of the modular cooling tower construction can be constructed utilizing tilt-up construction as described previously or by using pre-fabricated panels. When tilt-up construction is used, one or more concrete slabs may be positioned below the individual apparatus of the modular cooling tower construction. The slab can be used as the back side of the mold from which the walls are formed. The walls will then be tilted upward and positioned to form any number of apparatus desired. Because of the ease with which such apparatus can be built, a tower construction having an enormous cooling capacity can be easily constructed.

Advantages of the Cooling Tower Apparatus and Modular Cooling Tower Construction of the Present Invention as Compared to Other Industrial Cooling Towers The cooling tower apparatus and the modular cooling tower construction of the present invention provide many advantages over induced draft counterflow cooling towers which are most commonly used in the industry.

First, the cooling tower apparatus of the present invention, and the modular cooling tower construction of the present invention can be erected on site in a matter of days. Because the cooling tower apparatus and the modular cooling tower construction can be constructed with pre-fabricated panels or by using tilt-up construction, such construction is relatively easy and takes little time.

Tilt-up construction is possible because the fan is mounted on the ground surface below the tower. By locating the fan below the tower, the height of the apparatus, not including the height of the legs, can be limited to approximately twelve (12) feet. The overall height including the legs will vary from approximately sixteen to twenty-five feet. Because the walls are not required to support the weight of the fan, the thickness of the walls can be limited so that the weight of the walls does not prohibit the use of tilt-up construction. To the contrary, other industrial cooling towers fabricated from concrete require such thickness and weight that tilt-up construction is not feasible. Typical industrial cooling towers, fabricated from either wood or concrete, are major construction projects which take several months at a minimum to complete.

In addition to time savings, the cooling tower apparatus and modular cooling tower construction of the present invention can be built at reasonable costs, competitive with the costs of building wood cooling towers. However, the cooling towers of the present invention do not suffer from the same inadequacies as wood cooling towers. Because of the wet environment, wood cooling towers will deteriorate and require more maintenance than a concrete cooling tower.

Additionally, fan maintenance is much simpler with the present invention, since the fan of the present invention can be lowered to the ground surface where maintenance is to be performed. Contrarily, induced flow towers require that maintenance be performed on the fan at the top of the tower which is time consuming and burdensome.

The modular cooling tower described in U.S. Pat. No. 5,227,095 to Curtis, assigned to the Assignee of the present invention, addresses many of the difficulties associated with typical industrial cooling towers. The modular cooling towers described therein are direct flow cooling towers and, like the invention described herein, do not suffer from the same inadequacies as the typical industrial cooling tower. However, the present invention provides further advantages over the modular cooling tower described in the '095 patent. If a great capacity of cooling is required (i.e, a capacity greater than approximately 20,000 to 30,000 gallons per minute) the efficiency of the system described in the '095 system may decrease. This is due to several factors.

First, each modular cooling tower described in the '095 patent is a multi-fan unit. To the contrary, each apparatus of the present invention includes only one fan. When a large capacity is required, it is more economical to utilize the apparatus of the present invention to limit the number of fans.

In addition, there is a potential for freezing with the system described in the '095 patent. The towers described in the '095 patent collect water in a self-contained basin. When the tower is operating, the liquid in the basin is continuously pumped from the basin. However, when the tower is not operating, the water will remain in the basin. In winter time conditions, the water can freeze and damage the tower. The solution to such a problem is to heat the basin, or to construct a sump into which the water can be drained. The present invention does not suffer from such difficulties. With the apparatus of the present invention, all of the water will be emptied from the tower into a reservoir so that when the towers are inoperable, no water will be standing in the tower to create a freezing problem. Further, when the tower is not operating the pump which pumps water from the reservoir can be used to draw water from the reservoir and to bypass the tower and immediately circulate the water back to the reservoir. Because the water in the reservoir is circulating, the water will not freeze. Finally, when a great capacity is required, cost savings decrease with the '095 modules due to piping costs and lower pump efficiency. Thus, as provided herein, when a large capacity of cooling is required, the cooling tower apparatus and modular cooling tower construction of the present invention provides definite advantages over anything in the prior art.

Thus, it is seen that the apparatus of the present invention readily achieves the ends and advantages mentioned as well as those inherent therein. While certain preferred embodiments of the invention have been illustrated and described for purposes of the present disclosure, numerous changes may be made by those skilled in the art which changes are encompassed within the scope and spirit of the present invention as defined by the appended claims.

What is claimed is:

1. A cooling tower apparatus comprising:
   an enclosure defined by a pair of upstanding longitudinal side walls and a pair of upstanding transverse end walls, said side walls being concrete side walls;
   a body of fill material disposed in said enclosure;
   a liquid distribution system disposed in said enclosure positioned above said fill material for distributing liquid on top of said fill material, so that said liquid gravitates downward through said fill material;
   a drainage collection system located below said fill material for collecting said liquid gravitating through said fill material;
   at least one trough parallel to said side walls spanning the distance between said end walls, wherein said at least one trough receives said liquid from said drainage collection system; and
   a fan located below said drainage collection system for blowing air upward through said fill material.

2. The cooling tower apparatus of claim 1 further comprising a drift eliminator located above said liquid distribution system.

3. The apparatus of claim 1, wherein:
   said pair of longitudinal side walls are each supported by a pair of vertical support legs so that the lower ends of said side walls are raised above a ground surface, said longitudinal side walls having an upper end, and wherein;
   said transverse end walls comprise a rear end wall and a forward end wall, said transverse end wall being supported by a pair of support legs so that a lower end thereof is raised above said ground surface, said rear end wall having an upper end, said forward end wall having a lower end resting on said ground surface and having an upper end, said upper ends of said end walls and said side walls being substantially co-planar.

4. The cooling tower apparatus of claim 1 further comprising:
   a reservoir adjacent said cooling tower, wherein said trough carries said liquid to said reservoir.

5. A modular cooling tower construction comprising a second cooling tower apparatus in combination with said first cooling tower apparatus of claim 1, said second cooling tower apparatus being substantially similar to said first cooling tower apparatus, said at least one trough of said first cooling tower apparatus being in communication with said at least one trough of said second cooling tower apparatus.

6. The apparatus of claim 1 further comprising:
   a fan pedestal extending upward from a ground surface, said pedestal being located below a lower end of said enclosure, said fan being mounted on said fan pedestal, wherein said fan comprises:
   a motor;
   a gear box connected to said motor;
   a rotor shaft extending upwardly from said gear box; and
   a rotor attached to an upper end of said rotor shaft, wherein said rotor shaft extends upwardly past said lower end of said side walls, so that said rotor is located within said four sided enclosure.

7. The apparatus of claim 6 further comprising means for lifting and lowering said fan.

8. The apparatus of claim 6, wherein said fan pedestal comprises:
   a pair of spaced vertical support columns extending upwardly from said ground surface; and
   a horizontal mounting bracket attached to an upper end of said spaced vertical support columns, said fan being mounted on said mounting bracket.

9. The apparatus of claim 8, wherein said horizontal mounting bracket is releasably attached to said vertical support columns, so that said mounting bracket, including said fan, may be removed from said vertical support columns and lowered to said ground surface, thereby lowering said rotor below said lower end of said enclosure.

10. A modular cooling tower construction comprising:
    a first cooling tower apparatus, said first cooling tower apparatus comprising:
    a first longitudinal side wall;
    a second longitudinal side wall parallel to said first longitudinal side wall, said first and second longitudinal side walls having a space defined therebetween; and liquid receiving means operably associated with said first and second side walls for receiving a liquid passing downward through said cooling tower apparatus; and at least one additional cooling tower apparatus in combination with said first cooling tower apparatus, said at least one additional cooling tower apparatus being substantially similar to said first cooling tower apparatus, wherein said liquid receiving means of said first cooling tower apparatus is in direct fluid communication with said liquid receiving means of said at least one additional cooling tower apparatus.

11. The modular cooling tower construction of claim 10 further comprising a reservoir located adjacent said cooling tower construction, wherein said liquid received in said liquid receiving means of said first and said at least one additional cooling tower apparatus passes through an exit wall of said modular cooling tower construction and is dumped in said reservoir.

12. The modular cooling tower construction of claim 11, wherein said first and second longitudinal side walls comprise concrete side walls.

13. The modular cooling tower construction of claim 11, wherein said reservoir comprises a pair of transverse reservoir end walls and a pair of longitudinal side walls, and wherein said exit wall of said modular cooling tower construction is a common end wall which comprises one of said pair of transverse reservoir end walls.

14. The modular cooling tower construction of claim 13 further comprising a second modular cooling tower construction in combination with said first modular cooling tower construction, said second modular cooling tower construction being substantially identical to said first modular cooling tower construction, wherein said exit wall of said second modular cooling tower construction is directly opposed from said exit wall of said first modular cooling tower construction and wherein said exit wall of said second modular cooling tower construction is a common wall which comprises the other of said pair of transverse reservoir end walls, so that said liquid received in said liquid receiving means of the cooling tower apparatus of said first and second modular cooling tower constructions is dumped into said reservoir through said exit walls.

15. The modular cooling tower apparatus of claim 11 wherein said liquid receiving means comprises:

a first trough disposed at a lower end of said first longitudinal side wall; and a second trough disposed at a lower end of said second longitudinal side wall, said first cooling tower apparatus and said at least one additional cooling tower apparatus being connected longitudinally in series so that said first and second troughs of said first cooling tower apparatus and said first and second troughs of said at least one additional cooling tower apparatus are connected to form first and second substantially continuous liquid passageways respectively.

16. The modular cooling tower of claim 15 wherein said first and said at least one additional cooling tower apparatus comprise:

a body of fill material disposed in said space defined between said first and second longitudinal side walls;

a liquid distribution system located above said body of fill material for distributing liquid on top of said fill material so that said liquid will gravitate downward therethrough;

a drainage collection system located below said fill material for collecting said liquid gravitating downward through said fill material, wherein said drainage collection system communicates said liquid to said first and second troughs; and a fan for directing air upward through said fill material.

17. A modular cooling tower construction comprising:

a first cooling tower apparatus, said first cooling tower apparatus comprising:

first and second longitudinal side walls, said first and second side walls being substantially parallel and having a space defined therebetween;

a body of fill material disposed in said space between said first longitudinal side wall and said second longitudinal side wall;

a liquid distribution system located above said fill material for distributing liquid on top of said fill material, so that said liquid falls through said fill material;

a drainage collection system located below said fill material for collecting said liquid that falls through said fill material;

a first trough defined at a lower end of said first longitudinal side wall;

a second trough defined at a lower end of said second longitudinal side wall, wherein said drainage collection system communicates said liquid to said first and second troughs; and a fan located below said drainage collection system for blowing air upward through said body of fill material; and a second cooling tower apparatus in combination with said first cooling tower apparatus, said second cooling tower apparatus being substantially similar to said first cooling tower apparatus, said first and second cooling tower apparatus being arranged longitudinally in series so that said first troughs of said first and second cooling tower apparatus are connected, thereby forming a first substantially continuous liquid passageway, and so that said second troughs of said first and second cooling tower apparatus are connected, thereby forming a second substantially continuous liquid passageway.

18. The modular cooling tower construction of claim 17 further comprising a reservoir located adjacent an exit wall of said modular cooling tower construction, wherein said liquid received in said first and second liquid passageways flows into said reservoir through said exit wall.

19. The modular cooling tower construction of claim 17, wherein said first cooling tower apparatus and said second cooling tower apparatus each have an independent liquid supply.

20. The modular cooling tower construction of claim 17 further comprising:

a transverse rear end wall located at a rear end of said construction;

a transverse forward end wall located at a forward end of said construction, said forward end wall comprising an exit wall having a pair of exit openings;

a transverse partition wall located at a joint between said first and second cooling tower apparatus, said partition wall having a pair of openings defined therein for allowing liquid received in said first and second liquid passageways to pass therethrough, wherein said liquid received in said first and second liquid passageways flows in a direction from said rear end wall to said exit wall and exits said cooling tower construction through said pair of exit openings.

21. The modular cooling tower construction of claim 17 further comprising:

at least one additional cooling tower apparatus in combination with said first and said second cooling tower apparatus, said at least one additional cooling tower apparatus being substantially similar to said first and second cooling tower apparatus and being arranged longitudinally in series with said first and second cooling tower apparatus, so that said first and second troughs of said at least one additional cooling tower apparatus are aligned and in fluid communication with said first and second troughs respectively of said first and second cooling tower apparatus, wherein said first substantially continuous liquid passageway is comprised of said first troughs of said first, said second and said at least one additional cooling tower apparatus, and wherein said second substantially continuous liquid passageway is comprised of said second troughs of said first, said second and said at least one additional cooling tower apparatus.

22. The modular cooling tower construction of claim 21 further comprising:

a transverse rear end wall located at a rear end of said construction and a transverse forward end wall located at a forward end of said construction, said forward end wall comprising an exit wall having a pair of exit openings defined therein so that said liquid received in said first and second liquid passageways flows in a direction from said rear end wall to said forward end wall and exits said modular cooling tower construction through said exit openings; and a reservoir located adjacent said forward end wall, wherein said liquid exiting said modular cooling tower construction is dumped into said reservoir.

23. The modular cooling tower construction of claim 22 further comprising:

a second substantially identical modular cooling tower construction in combination with said first modular cooling tower construction, said first and said second modular cooling tower constructions being arranged so that said exit wall of said second modular cooling tower construction is directly opposed from said exit wall of said first modular cooling tower construction, wherein said reservoir is a common reservoir located between said first and second modular cooling tower constructions, so that liquid communicated to said exit openings in said first and second modular tower constructions is dumped into said common reservoir.

24. A method of constructing a cooling tower comprising:

(a) forming a transverse rear end wall on a substantially horizontal concrete slab located on a ground surface;

(b) tilting said transverse rear end wall up to a substantially vertical position;

(c) forming a pair of longitudinal side walls on said slab;

(d) tilting said longitudinal side walls upward to a substantially vertical position, said longitudinal side walls being parallel and having a space defined there between;

(e) forming a transverse forward end wall on said slab;

(f) tilting said forward end wall upward from said slab to a substantially vertical position;

(g) positioning said walls to form a four sided enclosure; and (h) locating a liquid distribution system in said enclosure for distributing liquid therein, so that said liquid passes downward through said enclosure.

25. The method of claim 24 further comprising placing a liquid receiving means in said enclosure prior to locating said liquid distribution system therein, to receive said liquid passing downward through said enclosure.

26. The method of claim 24, wherein said pair of longitudinal side walls comprise a first side wall and a second side wall, further comprising:

(i) placing a first trough at a lower end of said first side wall; and (j) placing a second trough at a lower end of said side wall, wherein said first and second troughs receive said liquid passing downward through said enclosure.

27. A cooling tower apparatus comprising:

an enclosure defined by a pair of upstanding longitudinal side walls and a pair of upstanding transverse end walls, said side walls being concrete side walls;

a body of fill material disposed in said enclosure;

a liquid distribution system disposed in said enclosure positioned above said fill material for distributing liquid on top of said fill material, so that said liquid gravitates downward through said fill material;

a drainage collection system located below said fill material for collecting said liquid gravitating through said fill material;

a fan located below said drainage collection system for blowing air upward through said fill material; and a fan pedestal extending upward from a ground surface, said pedestal being located below a lower end of said enclosure, said fan being mounted on said fan pedestal, wherein said fan comprises:

a motor;

a gear box connected to said motor;

a rotor shaft extending upwardly from said gear box; and a rotor attached to an upper end of said rotor shaft, wherein said rotor shaft extends upwardly past said lower end of said side walls, so that said rotor is located within said four sided enclosure, said fan pedestal being an adjustable height fan pedestal, wherein said height of said pedestal may be lowered so that said fan rotor drops below said lower end of said enclosure.

28. The apparatus of claim 27 wherein said adjustable height fan pedestal comprises:

a mounting pedestal, said mounting pedestal having a mounting surface defined thereon; and a removable mounting plate attached to said mounting surface of said mounting pedestal, said fan being releasably mounted to said removable mounting plate, said mounting plate having a height such that when said mounting plate is removed said fan rotor drops below said lower end of said enclosure.

29. The apparatus of claim 27, wherein said adjustable height fan pedestal comprises an upper portion, a center portion and a lower portion, said center portion of said pedestal being removable so that the height of said pedestal may be lowered thereby lowering said fan rotor below said lower end.

30. A cooling tower apparatus comprising:

an enclosure defined by a pair of upstanding longitudinal side walls and a pair of upstanding transverse end walls, said side walls being concrete side walls;

a body of fill material disposed in said enclosure;

a liquid distribution system disposed in said enclosure positioned above said fill material for distributing liquid on top of said fill material, so that said liquid gravitates downward through said fill material;

a drainage collection system located below said fill material for collecting said liquid gravitating through said fill material;

liquid receiving means operably associated with said pair of longitudinal side walls for receiving substantially all of said liquid from said drainage collection system; and a fan located below said drainage collection system for blowing air upward through said fill material.

31. The apparatus of claim 30, further comprising a reservoir located adjacent said four sided enclosure, wherein said receiving means further comprises a directing means for directing said liquid received therein to said reservoir.

32. The apparatus of claim 30 wherein said pair of longitudinal side walls comprises a first longitudinal side wall and a second longitudinal side wall, said first and second longitudinal side walls being substantially parallel, and wherein said receiving means comprises a first trough located at a lower end of said first side wall and a second trough located at a lower end of said second side wall.

33. The apparatus of claim 32, wherein said drainage collection system comprises a plurality of substantially parallel collection plates, said collection plates being substantially parallel to said transverse end walls so that said drainage collection plates communicate said liquid to said first and second troughs.

34. The apparatus of claim 32 wherein said transverse end walls comprise a rear end wall and a forward end wall, said forward end wall comprising an exit wall having a pair of exit openings defined therein, said apparatus further comprising:

a reservoir located adjacent said exit wall, said reservoir having a pair of longitudinal reservoir side walls and a pair of transverse reservoir end walls, said forward end wall of said cooling tower apparatus being a common wall which comprises one of said transverse reservoir end walls.

35. The apparatus of claim 34, wherein said liquid received in said troughs is directed to said exit openings and dumped into said reservoir, so that said exit wall of said apparatus comprises an entrance wall of said reservoir.

36. A modular cooling tower construction comprising:

a first cooling tower apparatus, said first cooling tower apparatus comprising:
a pair of longitudinal side walls;
a pair of transverse end walls, said side walls and said end walls defining an enclosure;
a body of fill material disposed in said enclosure;
a liquid distribution system disposed in said enclosure above said fill material; and
a drainage collection system located below said fill material for collecting liquid distributed by said liquid distribution system; and a second substantially similar cooling tower apparatus adjacent to and in combination with said first cooling tower apparatus, said modular cooling tower construction having a substantially continuous liquid passageway located below an end of said drainage collection systems of said first and second cooling tower apparatus for receiving liquid collected in said drainage collection systems.

37. The modular cooling tower construction of claim 36 wherein said substantially continuous liquid passageway is parallel to said longitudinal side walls.

38. The modular cooling tower construction of claim 36 wherein each of said first and second cooling tower apparatus further comprises a fan located below said drainage collection system.

39. The modular cooling tower construction of claim 36 further comprising a reservoir located adjacent said modular cooling tower construction for receiving said liquid from said substantially continuous passageway.

40. The modular cooling tower construction of claim 36 wherein said side walls are concrete walls.

* * * * *